(12) United States Patent
Roy

(10) Patent No.: US 11,794,750 B1
(45) Date of Patent: Oct. 24, 2023

(54) SNOW FRICTION DETERMINATION BY AUTONOMOUS VEHICLE

(71) Applicant: Matthew Roy, Ottawa (CA)

(72) Inventor: Matthew Roy, Ottawa (CA)

( * ) Notice: Subject to any disclaimer, the term of this patent is extended or adjusted under 35 U.S.C. 154(b) by 595 days.

(21) Appl. No.: 16/724,276

(22) Filed: Dec. 21, 2019

Related U.S. Application Data

(60) Provisional application No. 62/792,104, filed on Jan. 14, 2019.

(51) Int. Cl.
*B60W 40/068* (2012.01)
*B60T 8/172* (2006.01)
*G01N 19/02* (2006.01)
*B60C 23/20* (2006.01)

(52) U.S. Cl.
CPC ............ *B60W 40/068* (2013.01); *B60C 23/20* (2013.01); *B60T 8/1725* (2013.01); *G01N 19/02* (2013.01); *B60T 2210/12* (2013.01); *B60T 2240/03* (2013.01)

(58) Field of Classification Search
CPC ............ B60C 23/0435; B60C 23/0416; B60C 23/0489; B60C 23/0488; B60C 23/0415; B60C 23/0447; B60C 23/0494; B60C 23/062; B60C 23/0457; B60C 23/0459; B60C 23/0466; B60C 23/0471; B60C 23/0486; B60G 2800/984; B60T 2240/06; B60T 2240/07; B60T 2240/08; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G02F 1/31; G02F 2203/12; G01M 17/013; H02S 10/12; H02S 20/21; H02S 20/22
See application file for complete search history.

(56) References Cited

U.S. PATENT DOCUMENTS

| | | | | |
|---|---|---|---|---|
| 9,643,617 B2* | 5/2017 | Fischer et al. | ....... | G06V 20/588 |
| 10,773,725 B1* | 9/2020 | Ilievski et al. | .... | B60W 60/0015 |
| 2004/0154715 A1* | 8/2004 | Dufournier | ........... | B60C 11/24 340/425.5 |
| 2006/0095172 A1* | 5/2006 | Abramovitch et al. | | G01C 21/26 701/28 |
| 2015/0178572 A1* | 6/2015 | Omer et al. | ........ | G08G 1/0141 382/108 |
| 2015/0203107 A1* | 7/2015 | Lippman | .............. | B60W 30/00 701/23 |
| 2015/0251659 A1* | 9/2015 | Fischer et al. | ........ | B60T 8/171 382/104 |
| 2016/0229460 A1* | 8/2016 | Kowalk | ................... | B60S 1/66 |

(Continued)

FOREIGN PATENT DOCUMENTS

| CN | 109080608 A | * | 12/2018 | ................B60T 8/1755 |
|---|---|---|---|---|
| CN | 110399664 A | * | 11/2019 | |
| DE | 102017218902 A1* | | 4/2019 | |

(Continued)

*Primary Examiner* — Harshad R Patel
*Assistant Examiner* — Gedeon M Kidanu

(57) ABSTRACT

A autonomous vehicle comprising a sensor for sensing a physical property indicative of snow slipperiness; and a processor communicatively connected to the sensor to receive a signal from the sensor indicative of the snow slipperiness, to process the signal and to generate an estimated instantaneous coefficient of friction between a tire of the vehicle and a snow-covered roadway.

17 Claims, 28 Drawing Sheets

(56) References Cited

U.S. PATENT DOCUMENTS

| | | | |
|---|---|---|---|
| 2017/0010184 A1* | 1/2017 | Singh | B60C 19/00 |
| 2017/0374297 A1* | 12/2017 | Jhabvala et al. | H04N 5/33 |
| 2018/0338117 A1* | 11/2018 | Park et al. | G05D 1/0246 |
| 2018/0356821 A1* | 12/2018 | Kentley-Klay et al. | G05D 1/0287 |
| 2019/0161085 A1* | 5/2019 | Dudar et al. | G06T 7/50 |
| 2020/0001806 A1* | 1/2020 | Celinske et al. | B60R 16/04 |
| 2020/0079381 A1* | 3/2020 | Lombrozo et al. | B62D 6/003 |
| 2020/0324779 A1* | 10/2020 | Chazal et al. | G08G 1/096708 |

FOREIGN PATENT DOCUMENTS

| | | | | |
|---|---|---|---|---|
| JP | H0650878 | A * | 2/1994 | |
| JP | 2017084110 | A * | 5/2017 | |
| WO | 2011007015 | A1* | 1/2011 | B60W 40/068 |

* cited by examiner

SNOW FRICTION DETERMINATION BY AUTONOMOUS VEHICLE

CROSS-REFERENCE TO RELATED APPLICATIONS

This application claims priority from U.S. Provisional Pat. Application 62/792,104 filed Jan. 14, 2019.

TECHNICAL FIELD

The present invention relates generally to self-driving or autonomous vehicles and, in particular, to technologies for evaluating roadway conditions.

BACKGROUND

Autonomous or self-driving vehicles use sensors such as RADAR, LIDAR and/or cameras to provide signals to a processor or controller that generates and outputs steering, acceleration and braking signals to the vehicle. A Global Navigation Satellite System (GNSS) receiver such as a Global Positioning System (GPS) receiver is also used for navigation. As the self-driving vehicle drives autonomously toward a destination, the vehicle will encounter other self-driving vehicles. Self-driving vehicles in a given area of a road mutually sense each other's presence using various sensors for collision avoidance and may communicate, via vehicle-to-vehicle messaging protocols, with each other to avoid collisions.

Some technologies exist for evaluating whether a roadway is covered by ice or snow in order to enable the autonomous vehicle to adjust its driving accordingly. Applicant has recognized that a fundamental drawback of the technologies proposed to date is that they fail to take into account the quality of the snow on the roadway. The slipperiness of snow varies significantly depending on various physical factors such as temperature and the wetness of the snow. There is a need for a technology to enable an autonomous vehicle to determine how slippery the snow is on the roadway in order to adjust driving behaviour accordingly.

SUMMARY

In general, the present invention provides an autonomous (self-driving) vehicle that determines snow slipperiness in order to adjust its driving behaviour.

One inventive aspect of the disclosure is an autonomous vehicle comprising a sensor for sensing a physical property indicative of snow slipperiness; and a processor communicatively connected to the sensor to receive a signal from the sensor indicative of the snow slipperiness, to process the signal and to generate an estimated instantaneous coefficient of friction between a tire of the vehicle and a snow-covered roadway.

Another inventive aspect of the disclosure is an autonomous vehicle comprising a plurality of sensors for sensing physical properties indicative of snow slipperiness, a processor communicatively connected to the sensors to receive signals from the sensors indicative of snow slipperiness, to process the signals and to generate an estimated instantaneous coefficient of friction between a tire of the vehicle and a snow-covered roadway wherein the processor causes a driving behaviour of the vehicle to be adjusted based on the estimated instantaneous coefficient of friction.

In some embodiments, the processor of the autonomous vehicle adjusts a driving behaviour based on the estimated instantaneous coefficient of friction determined by the processor.

The autonomous vehicle in some embodiments further comprises a radio frequency transmitter that cooperates with the processor to transmit the estimated instantaneous coefficient of friction to another vehicle.

In some embodiments, the processor of the autonomous vehicle receives accelerometer data indicative of one or more of braking slippage, acceleration slippage and cornering slippage and wherein the processor correlates the estimated instantaneous coefficient of friction with the accelerometer data in order to refine a model that relates how the signal from the sensor is processed to be indicative of snow slipperiness.

The sensor in one embodiment is a road camera that captures images of a road that is at least partially covered with snow. The images are processed by the processor to determine the slipperiness of the road. This may be done by classifying images or extracting features of the images indicative of snow depth and snow type (packed/compacted snow versus drifting/powdery snow).

In one embodiment, the sensor is an air temperature sensor that determines or senses an exterior ambient air temperature.

In another embodiment, the sensor is a surface temperature sensor that determines or senses the surface temperature of the snow-covered roadway.

The sensor in one embodiment is an optical sensor that cooperates with the processor to determine a snow flake size of falling snow.

In another embodiment, the sensor is a thermal imaging camera that senses a temperature of the snow on the road.

The autonomous vehicle in one embodiment further comprises a tire sensor for sensing a physical property of the tire.

In one embodiment, the tire sensor is a tire temperature sensor that measures a surface temperature of the tire. For example, the tire temperature sensor may be an infrared sensor that measures the infrared signature of the tire. The tire temperature sensor may be mounted in the wheel well. The tire temperature sensor may be a wireless sensor embedded directly into the tire. The tire sensor may be a camera or other optical sensor that visually scans a tire tread to determine how much the tire tread is clogged by snow.

In another embodiment, the sensor is an acoustic sensor to receive tire-snow acoustic signals.

In another set of embodiments, an autonomous vehicle comprises a plurality of sensors for sensing physical properties indicative of snow slipperiness and a processor communicatively connected to the sensors to receive signals from the sensors indicative of snow slipperiness, to process the signals and to generate an estimated instantaneous coefficient of friction between a tire of the vehicle and a snow-covered roadway. In these embodiments, the processor causes a driving behaviour of the vehicle to be adjusted based on the estimated instantaneous coefficient of friction.

In some of these embodiments, the autonomous vehicle comprises a radio frequency transmitter that cooperates with the processor to transmit the estimated instantaneous coefficient of friction to another vehicle.

In some of these embodiments, the processor receives accelerometer data indicative of one or more of braking slippage, acceleration slippage and cornering slippage and wherein the processor correlates the estimated instantaneous coefficient of friction with the accelerometer data in order to refine a model that relates how the signals from the sensors are processed to be indicative of snow slipperiness.

In some of these embodiments, the plurality of sensors comprises an air temperature sensor to determine an exterior ambient air temperature and a surface temperature sensor to determine a surface temperature of the snow-covered roadway.

In some of these embodiments, the plurality of sensors comprises a first optical sensor to capture images of a road that is at least partially covered with snow and a second optical sensor to determine a snow flake size of falling snow.

In some of these embodiments, the plurality of sensors comprises a tire sensor for sensing a physical property of the tire and an acoustic sensor to receive tire-snow acoustic signals. The tire sensor measures a surface temperature of the tire. The tire sensor visually scans a tire tread to determine how much the tire tread is clogged by snow The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
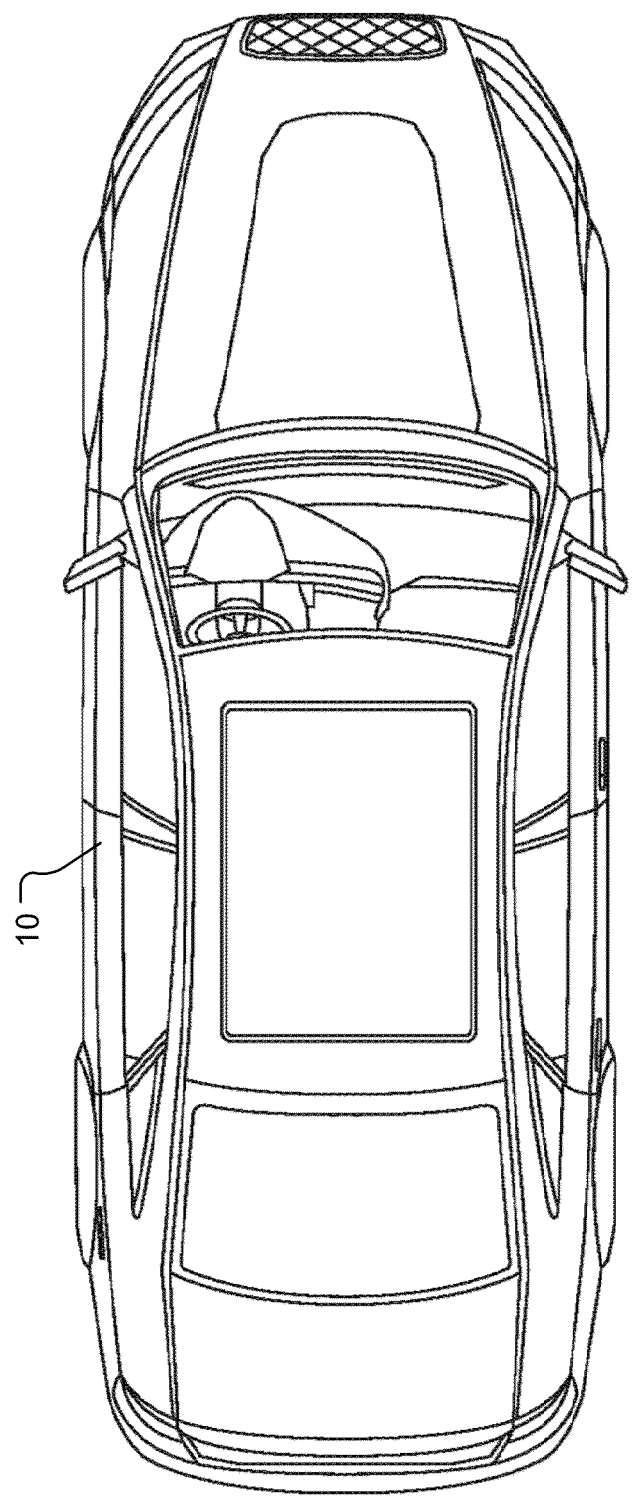
FIG. 1 is a top view of an autonomous ("self-driving") vehicle in accordance with an embodiment of the present invention.
Figure 2:
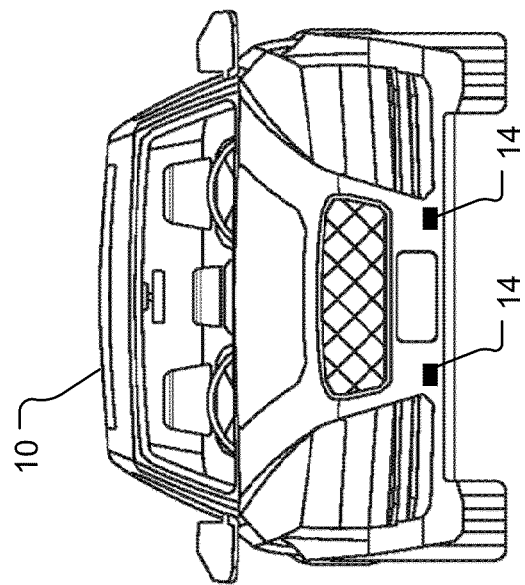
FIG. 2 is a front view of the autonomous vehicle of FIG. 1.
Figure 3:
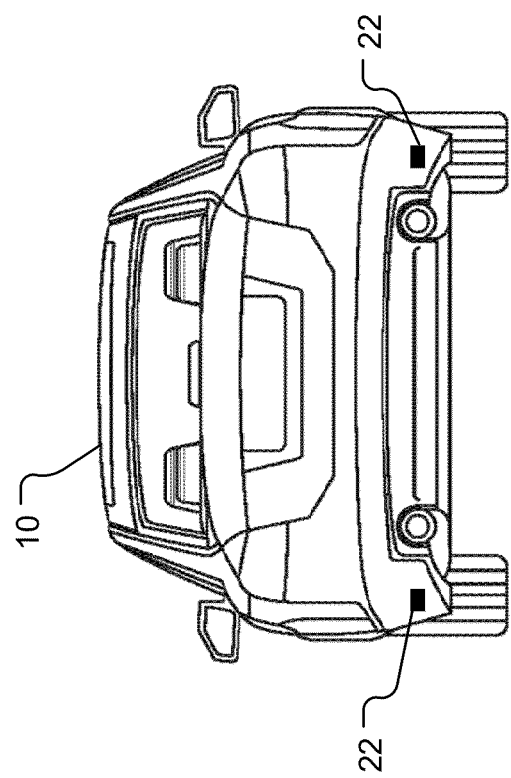
FIG. 3 is a rear view of the autonomous vehicle of FIG. 1.

Disclosed herein are various embodiments of a self-driving (autonomous) vehicle capable of evaluating, determining or estimating the slipperiness of snow on a snow-covered roadway in order to adjust its driving behaviour. The autonomous vehicle has one or more sensors and one or more processors configured to evaluate, determine or estimate the slipperiness of the snow that is covering or partially covering a roadway over which the vehicle is driving. The vehicle determines the coefficient of friction of the snow by sensing one or more characteristics of the snow and/or the ambient environmental conditions, e.g. air temperature, road surface temperature, relative humidity, degree of snow compaction, flake size of falling snow, acoustic signature of tire-snow interaction, to name a few physical properties that can be used singly or in any suitable combination to characterize the slipperiness of the snow or ice. The vehicle may also share slipperiness data with other vehicles, thereby enabling the vehicle to receive snow slipperiness data from vehicles driving ahead of it on the same segment of roadway.

For the purposes of this specification, it will be understood that slipperiness and friction are closely related concepts: the slipperier the road, the lower the friction or, conversely, the less slippery the road, the higher the friction. The coefficient of friction is the ratio of the frictional friction to the normal force where the normal force is equal to the weight, i.e. mass times the gravitational constant.

Coefficients of friction for a tire on a paved road differ for a rolling tire (static friction) and a locked tire (kinetic friction). For a typical four-season tire, the coefficient of static friction is about 0.7 for dry roads, 0.4 for wet roads, 0.2 for a snow-covered road and 0.1 for an ice-covered road. For a snow-covered road, instead of merely assuming a coefficient of 0.2, the embodiments of the present invention provide a significantly more accurate friction estimation by sensing properties of the snow, such as temperature, humidity and degree of compaction. Thus, instead of assuming a coefficient of 0.2, the processor may estimate using its snow sensors that the coefficient of friction on the snow-covered road is, for example, 0.17 or 0.23.

Embodiments of the invention enable the vehicle to predict, or at least estimate to a useful degree, the coefficient of friction or slipperiness between the tires and the snow-covered roadway to thereby determine how slippery the snow is and thus how the vehicle should brake, accelerate and corner in order to compensate for the slipperiness of the snow. Unlike prior art technologies which evaluate only whether the roadway is covered by snow or not, the embodiments of the invention characterize the snow on the roadway to determine or predict how slippery the snow is.

Snow slipperiness (or the coefficient of friction of snow) changes as a function of various physical attributes such as temperature. The coefficient of friction of snow generally decreases from zero Celsius to approximately -8 C and then generally increases again as the temperature falls. The quality of the snow (wet versus dry, or packed/compact versus loose/powdery) also affect slipperiness. The presence of an underlying layer of ice, especially black ice under the snow, especially loose or powdery snow, can make a roadway particularly slippery. The snow slipperiness, or snow friction, can be used by the autonomous vehicle to modify its driving behaviour. The coefficient of friction between a tire and ice generally increases as the temperature decreases, e.g. from about 0.1 at -5 C to 0.6 at -25 C.

For the purposes of this specification, the terms "autonomous vehicle" or "self-driving vehicle" are meant to encompass any land vehicle such as a car, van, minivan, sports utility vehicle (SUV), crossover-type vehicle, bus, minibus, truck, tractor-trailer, semi-trailer, construction vehicle, work vehicle, tracked vehicle, semi-tracked vehicle, offroad vehicle, electric cart, or the like. The terms "autonomous vehicle" and "self-driving vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

FIGS. 1-5 depict a self-driving car 10 as one exemplary implementation of a self-driving vehicle or autonomous vehicle (AV). The self-driving vehicle or autonomous vehicle 10 includes, in the illustrated embodiment, a vehicle chassis 12 and a plurality of wheels 13, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric power plant. In a variant, the vehicle may have multiple electric motors for driving different wheels. In another variant, the motor may be a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle 10 may also be a mixed-mode human-drivable and self-drivable vehicle such as a self-driving car, truck, van, etc. that can be optionally driven directly by a human driver sitting in the driver's seat in which case the vehicle has two operating modes: (i) a conventional human driver mode with a human directly driving the vehicle using the steering wheel, brake pedal and accelerator as is conventionally done with non-autonomous vehicles; (ii) a self-driving (or autonomous) mode in which the vehicle's processor or computing system drives autonomously without direct human input, whether a human is seated in the driver's seat or not.

The autonomous vehicle 10 depicted by way of example in FIGS. 1-5 includes a plurality of sensors i.e. environment-detecting sensors for collision avoidance and following a road. The sensors may include RADAR, LIDAR, cameras and ultrasonic rangefinders. The autonomous (or self-driving) vehicle 10 further includes a self-driving processor, processors or computing device(s) configured to receive analog or digital signals (data) from the sensors and to generate steering, acceleration and braking control signals for controlling the steering system, the motor and the braking system of the vehicle. The autonomous driving processor may generate a steering control signal, an acceleration control signal and a braking control signal based on the signals received from the sensors. The autonomous driving processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

In addition to the plurality of autonomous driving sensors used for autonomous driving, the autonomous vehicle may have one or more sensors for sensing a physical property indicative of snow slipperiness. The additional sensors may be referred to as snow-slipperiness sensors or snow-friction sensors. The snow-slipperiness sensors (or snow-friction sensors) may be separate sensors or these may be sensors that also detect other road features. For example, a camera may detect contours of the roadway and other vehicles (as is done in standard self-driving vehicles) but in addition the camera can be configured to detect the type of snow on the roadway. The same sensor in this example, i.e. the camera, is thus used as both the road feature recognition camera and the snow sensor. Thus, in some embodiments, separate snow slipperiness sensors are provided yet in other embodiments existing sensors on the vehicle are used to provide at least some of the physical measurements needed to determine the snow slipperiness.

Figure 4:
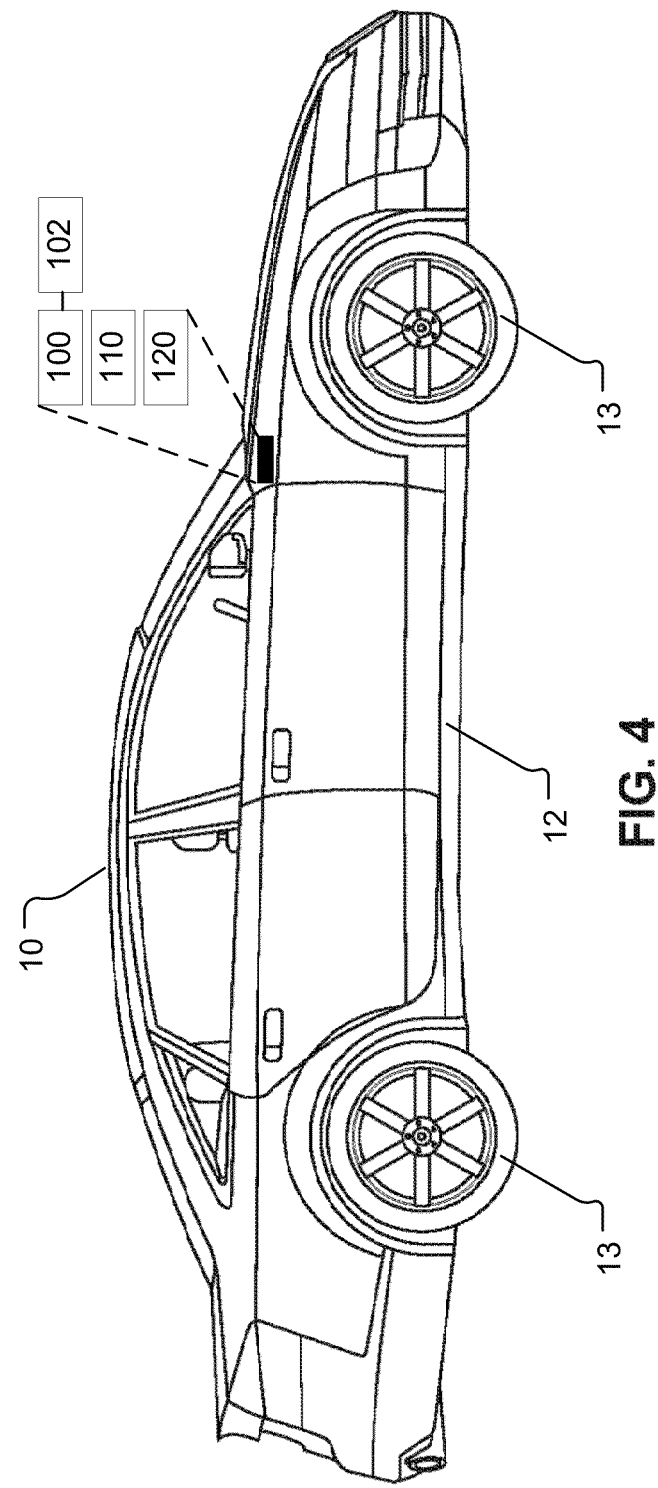
FIG. 4 is a right side view of the autonomous vehicle of FIG. 1.
Figure 5:
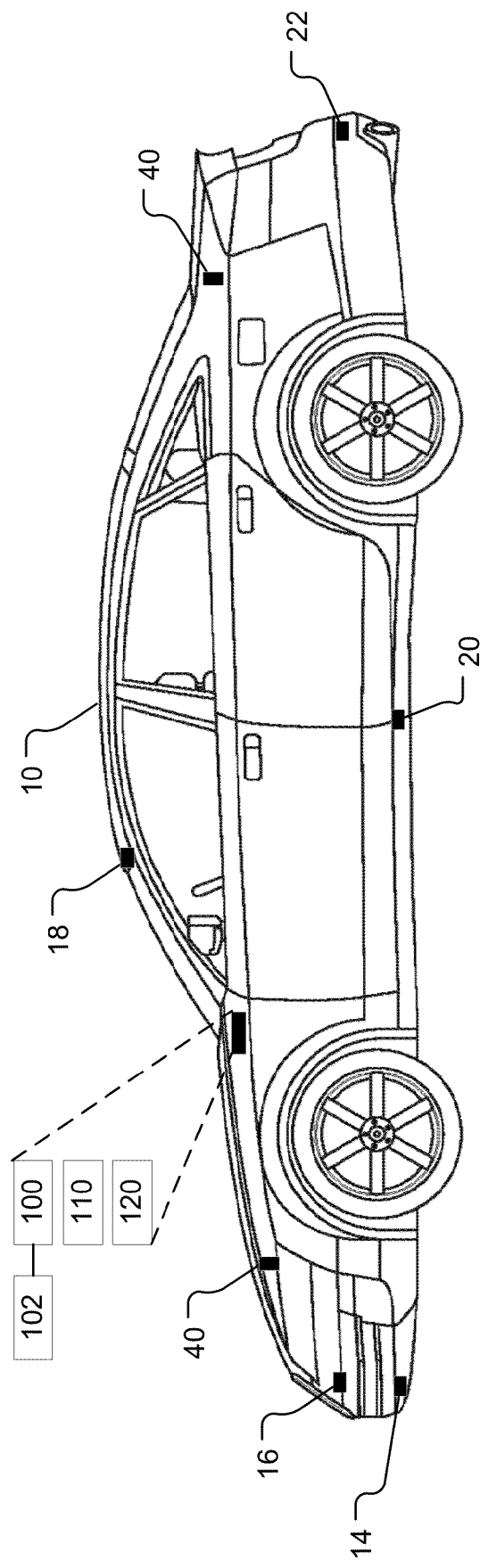
FIG. 5 is a left side view of the autonomous vehicle of FIG. 1.

The autonomous vehicle of FIGS. 1-5 also has a processor 100 communicatively connected to the sensor(s) to receive a signal from the sensor(s) indicative of the snow slipperiness, to process the signal and to generate an estimated instantaneous coefficient of friction between a tire of the vehicle and a snow-covered roadway. The processor 100 may be a separate snow friction processor or it may be the same central processor that controls the autonomous driving (steering, braking, turning). There may be a single processor 100 or a plurality of processors for determining the slipperiness of the snow based on the signals received from the sensor(s). The vehicle may include a memory 102 as shown in FIGS. 4-5. The memory 102 may be communicatively connected to the processor 101 by a data bus. The memory may include a non-volatile storage device and/or a volatile storage device. The memory may be used to store sensor signal data and/or processed data that includes slipperiness or friction coefficient data determined by the processor. The memory can store or buffer data to be periodically or sporadically transmitted to another vehicle or remote server as will be further detailed below.

The processor 100 directly or indirectly autonomously adjusts a driving behaviour of the autonomous vehicle based on the estimated instantaneous coefficient of friction determined by the processor. If a central processor both controls autonomous driving functions and determines snow slipperiness, the central processor adjusts the driving behaviour directly. If a separate snow friction processor is used, the snow friction processor communicates the snow friction data to the autonomous driving processor to cause the latter to adjust driving behaviour based on the snow friction data. This is considered an indirect adjustment of driving behaviour because the snow processor provides the snow slipperiness data to the central autonomous driving processor to enable the latter to adjust the driving behaviour of the autonomous vehicle. For example, if the snow is slippery, the processor may give the autonomous vehicle more time and distance to brake more gently, may take a curve more slowly, may accelerate more gently, or take any other action to compensate for the lower friction coefficient between the tire and snow-covered road. Conversely, if the snow friction is less slippery, the processor may brake, accelerate and turn more aggressively than it would for very slippery snow.

The processor 100 can employ a simple snow friction algorithm that initially uses a sensor to determine the type of road cover, i.e. ice or snow or bare pavement. If the sensor detects that the road is covered with ice, the baseline coefficient of friction is set to 0.1. If the sensor detects that the road is covered with snow, the baseline coefficient of friction is set to 0.2. If the sensor detects bare pavement, the processor operates in normal driving mode. In one example, the processor can then cooperate with a sensor to determine the air temperature or the road surface temperature. Using this sensed temperature, the processor can apply a temperature friction correction to the baseline coefficient of friction to obtain a temperature-corrected coefficient of friction. For example, for cold snow, the coefficient of friction may be modified to 0.14. A humidity correction may be applied knowing that the coefficient of friction generally increases with humidity. A snow flake size correction may be applied to the coefficient of friction, knowing that friction generally increases with snow flake size. Further correction factors may be applied based on snow compaction and/or snow texture (visually determined and/or acoustically determined). For example, the snow friction model may be provided with coefficients as follows: 0.24 for compacted snow at 0° C. and 0.37 for compacted snow at -25° C. with interpolated values in between; 0.15 for uncompacted snow at 0° C. and 0.42 for uncompacted snow at -25° C. with interpolated values in between; 0.45 for white frost at 0° C. and 0.58 for white frost at -25° C. with interpolated values in between; 0.92 for deep snow at 0° C. and 0.95 for deep snow at -25° C., 0.59 for dry asphalt at -40° C. and 0.72 for dry asphalt at -10° C. with interpolated values in between. The numbers for the coefficient are merely provided as examples. The correction factors may be combined or concatenated (e.g. all multiplied together and optionally weighted) to provide a total corrected coefficient of friction based on the sensed snow properties. A correction factor may be weighted using a weighting variable to modify (increase or decrease) the correction factor. The weighting variable may be a speed of the vehicle, tire type, or user-specified safety factor. The tire's coefficient of friction may be a single omnidirectional coefficient of friction for both the longitudinal and lateral directions of the tire or there may be two separate coefficients of friction, i.e. one for the longitudinal direction of the tire (for acceleration and braking) and one for the lateral direction of the tire (for cornering).

In one implementation, the vehicle can use one of its sensors to detect salt and/or sand on the roadway and to apply a salt correction factor or a sand correction factor to the ice or snow coefficients (in addition to any other applicable correction factors) to provide a salt-corrected coefficient or sand-corrected coefficient.

The processor may select which factors to utilize in computing the coefficient of friction. The selection by the processor may be performed automatically or in response to user input. Automatic selection may be performed using various criteria, e.g. sensor reliability criteria. For example, a camera is reliable during daytime but unreliable at night. Therefore, the processor may choose to not use camera sensor data when driving at night or in low-light conditions.

The autonomous vehicle processor (or a snow friction processor separate from the main autonomous driving processor) can be linked to one or a plurality of snow-quality sensors as will be described below. These links may be via data communication buses, wires, or cables. Alternatively, these links may be wireless channels.

In the illustrated embodiment of FIGS. 1-5, the vehicle has a first sensor 14, a second sensor 16, a third sensor 18, and a fourth sensor 20. In the illustrated embodiment of FIGS. 1-5, the first, second, third and fourth sensors can be visible-spectrum cameras, infrared cameras and/or thermal imaging cameras. One or more of the sensors can also be RADAR or LIDAR. As noted above, one or more of the autonomous driving sensors of the vehicle can double as snow-quality sensors. For example, a fifth sensor 22 i.e. a rear (backup) camera, can also be used to collect snow-quality data. Additional sensors may be provided on the vehicle 10, including additional camera, additional LIDAR and RADAR sensors. The location of the sensors on the vehicle may be varied from what is shown in the figures. A different suite of sensors from what is illustrated may be used in other variants. These sensors are communicatively connected, either by wired or wireless channels, to the processor 100.

The autonomous (self-driving) vehicle 10 depicted by way of example in FIGS. 1-5 further includes a data transceiver 110, e.g. a cellular data transceiver, short-range wireless transceiver, a satellite transceiver or any other radiofrequency data transceiver. The data transceiver 110 may be any suitable wireless data transceiver for transmitting and receiving data wirelessly. In one main embodiment, the data transceiver is a cellular data transceiver (e.g. GSM, LTE, 5G or equivalent) that transmits data to a remote internet-connected server whose functionality will be further described below.

Figure 6:
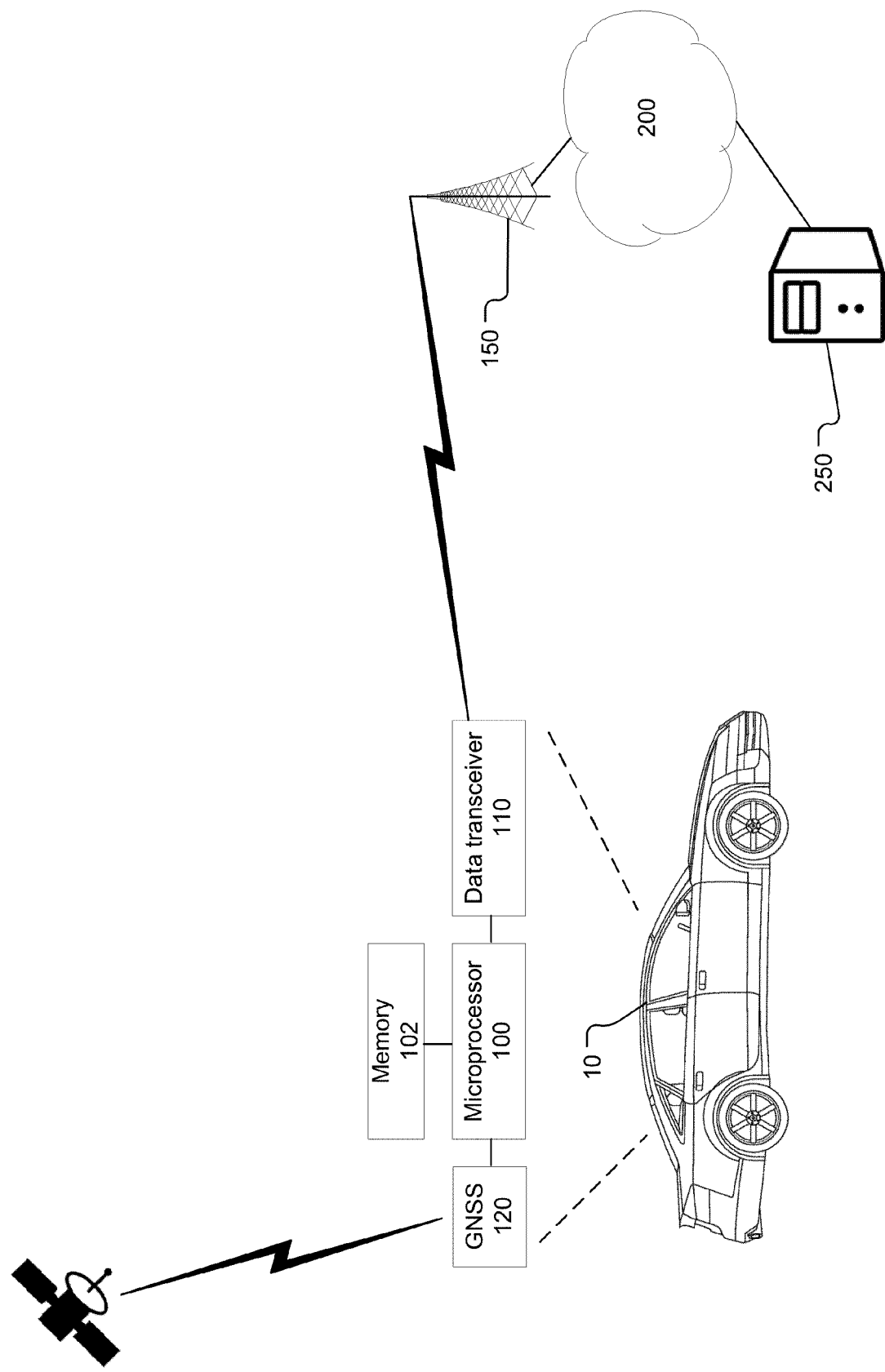
FIG. 6 illustrates a system in which an autonomous vehicle wirelessly shares road slipperiness data with a server.

As shown in the system of FIG. 6, the data transceiver 110 of the vehicle 10 is configured to wirelessly communicate data from the vehicle to a server 250 by attaching communicatively to a base transceiver station 150. Data is transmitted and received over a cellular wireless network using cellular communication protocols and standards for packet data transfer such as GSM, CDMA, GPRS, EDGE, UMTS, LTE, etc. The vehicle 10 may include a Subscriber Identity Module (SIM) card for GSM-type communications or a Re-Usable Identification Module (RUIM) card for CDMA-type communications. The packetized data transmitted to the base transceiver station 150 is then routed through the internet 200 to a server 250 which receives, processes, stores and distributes snow friction data to other vehicles.

The vehicle 10 may also include a short-range data transceiver 110 such as a Wi-Fi® transceiver and/or a Bluetooth® transceiver for short-range data communication with other vehicles. The vehicle 10 may also exchange V2V messages using IEEE 802.11p Dedicated Short-Range Communications (DSRC) in the 5.9 GHz band used, or to be used, by intelligent transportation systems (ITS). The DSRC messages are half duplex messages in the 5.850-5.925 GHz range and are short-range (approximately 300 m) and have a high data rate of 6-27 Mbps.

The vehicle 10 may optionally include an onboard diagnostics port and/or one or more other data communication ports or sockets for wired connections, e.g. USB, HDMI, FireWire (IEEE 1394), etc. or ports or sockets for receiving non-volatile memory cards, e.g. SD (Secure Digital) card, miniSD card or microSD card. These physical data connections may be used to load data onto the memory or to copy data from the memory. For example, the data communication ports may be used to upgrade software, to obtain diagnostics for servicing and maintenance, or to upload configuration data to the memory to configure the vehicle for different types of behaviours.

The self-driving or autonomous vehicle 10 depicted by way of example in FIG. 6 further includes a Global Navigation Satellite System (GNSS) receiver 120 for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system. The processor 100 may cause the data transceiver 110 to transmit the snow friction data along with location coordinates from the GNSS receiver 120 so that the server 250 can store location-specific snow friction data. The location-tagged snow data may also be stored by the vehicle for its own use, e.g. when returning home over the same route or shared with other nearby vehicles. The snow data may also be time-stamped in addition to being location-tagged.

In the vehicle-server system of FIG. 6, the autonomous vehicle 10 can provide snow data to the server 250 and/or receive snow data from the server 250. In the embodiment of FIG. 6, the autonomous vehicle 10 uses at least one sensor to sense a physical property indicative of snow slipperiness, e.g. air temperature, snow-covered road surface temperature, humidity, acoustics of tire-snow interaction, etc. The processor 100 on the vehicle is communicatively connected to the at least one sensor to receive a signal from the at least one sensor indicative of the snow slipperiness. The processor 100 is configured to process the signal and to generate an estimated instantaneous coefficient of friction between a tire of the vehicle 10 and a snow-covered roadway. In some embodiments, the processor 100 causes a driving behaviour of the autonomous vehicle 10 to be adjusted based on the estimated instantaneous coefficient of friction determined by the processor 100.

In some embodiments, the processor 100 implements a learning algorithm or artificial intelligence (AI) that learns how estimated instantaneous coefficients of friction correlate to actually measured braking, acceleration and cornering data obtained by accelerometers on the vehicle. For self-learning, the autonomous vehicle 10 can have a plurality of accelerometers 40 as shown in FIG. 5 which are communicatively connected to the processor to receive accelerometer data indicative of one or more of braking slippage, acceleration slippage and cornering slippage. The processor 100 is configured in some embodiments to correlate the estimated instantaneous coefficient of friction with the accelerometer data in order to refine a model that relates how the signal from the sensor is processed to be indicative of snow slipperiness. In addition, or in lieu of the accelerometers, the vehicle may have wheel speed sensors, e.g. ABS (anti-lock braking) sensors, to detect wheel slippage. The processor 100 can use the wheel speed and vehicle speed to determine an actual (measured) coefficient of friction. This actual coefficient can be compared with a predicted coefficient to refine the friction model.

The vehicle's processor 100 can, for example, compare a predicted braking distance or braking deceleration determined using the predicted friction with an actual (measured) deceleration. The processor 100 can then adjust how the processor interprets its own sensor data to predict the coefficient of friction. Thus, the vehicle over time can hone the accuracy of the friction determination by correlating predicted snow friction data with accelerometer data. In another embodiment, the server 250 implements the learning algorithm in addition to or instead of the vehicle processor. In this latter implementation, the server (or a cluster of servers or a server farm) receives snow sensor data from a plurality of vehicles as well as respective accelerometer data from the vehicles in order to perform the correlations and to thus hone the friction model. Refined friction models can then be distributed by the server 250 to the vehicles 10. The server 250 may also receive tire data, e.g. type of tire, tread wear, etc.

Snow slipperiness data may be obtained using a variety of different sensors on the vehicle. In one embodiment, the sensor is an air temperature sensor that determines or senses an exterior ambient air temperature. Ambient air temperature is then correlated to snow friction for a snow-covered road. Ambient air temperature is also correlated to ice friction for an ice-covered road.

In another embodiment, the sensor is a contactless surface temperature sensor (e.g. an infrared sensor) that remotely senses the surface temperature of the snow-covered roadway or of an ice-covered roadway.

In another embodiment, the processor can use data from both an air temperature sensor and a road surface temperature sensor to determine the slipperiness of the snow.

Figure 7:
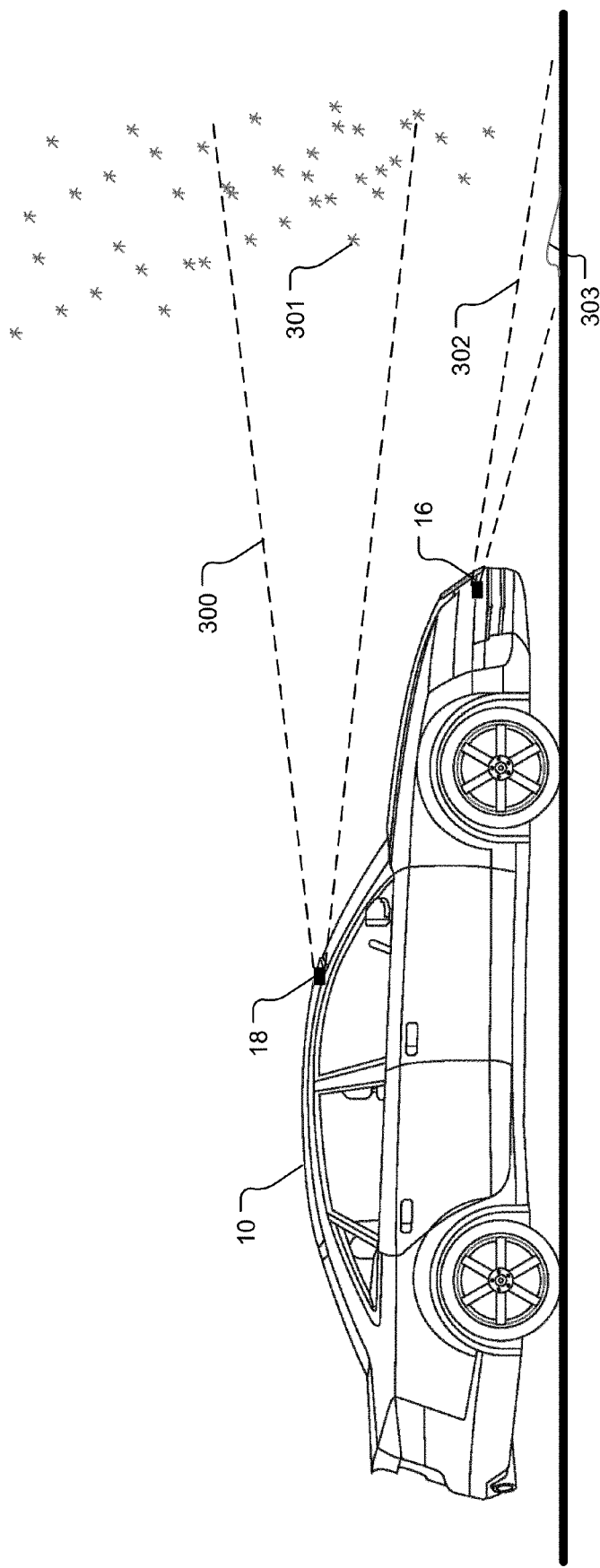
FIG. 7 depicts an autonomous vehicle sensing falling snow and snow on a road using two separate sensors.
Figure 8:
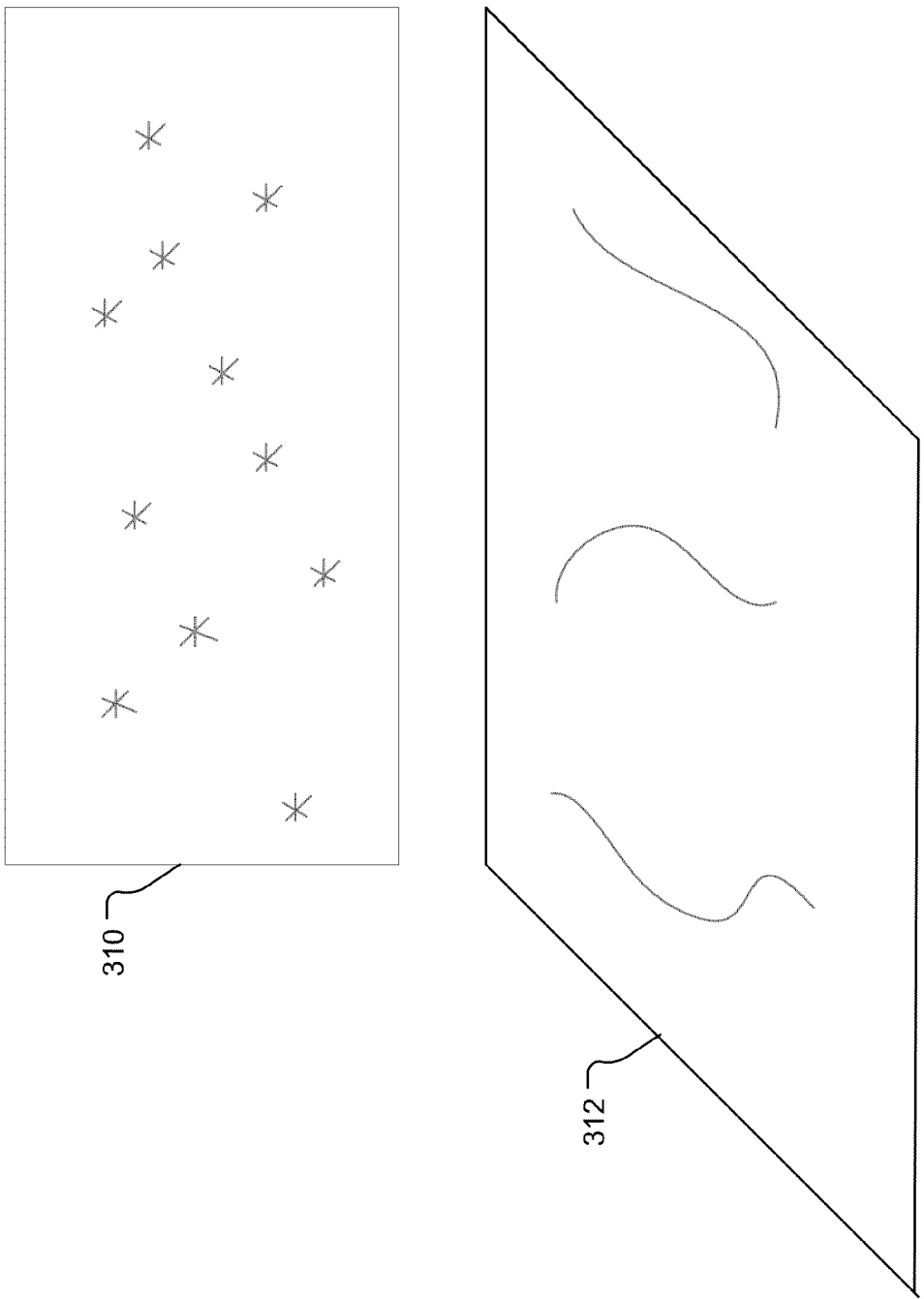
FIG. 8 depicts two images captured by the two sensors of the vehicle of FIG. 7.

In the example embodiment of FIG. 7, the autonomous vehicle 10 has two forward-facing sensors 16, 18. For example, these sensors 16, 18 may be an upper forward-facing camera 18 and a lower road-facing camera 16. The lower camera 16 captures images of a road that is at least partially covered with snow. The upper camera captures images 310 of the falling snow 301 in a field of view 300 ahead of the vehicle. The lower camera captures images 312 of accumulated snow 303 within a field of view 302 on the road. The camera images 310, 312 (which are shown schematically and by way of example in FIG. 8) are processed by the processor 100 to determine the slipperiness of the road. Any suitable frame rate can be used depending on the processor speed. In one embodiment the frame rate is varied depending on vehicle speed. Determining snow slipperiness may be done by classifying images, comparing images to a database of reference images, or extracting features of the images indicative of snow depth and snow type (packed/compacted snow versus drifting/powdery snow). The average snow flake size or shape may be determined from the images from the upper camera 18. The topology, whiteness shade, snow drift, degree of compaction of the accumulated snow can be determined from the images taken by the lower camera 16. In another embodiment, another type of optical sensor (other than a visible-spectrum camera) can be provided to cooperate with the processor to determine a snow flake size of falling snow.

Figure 9:
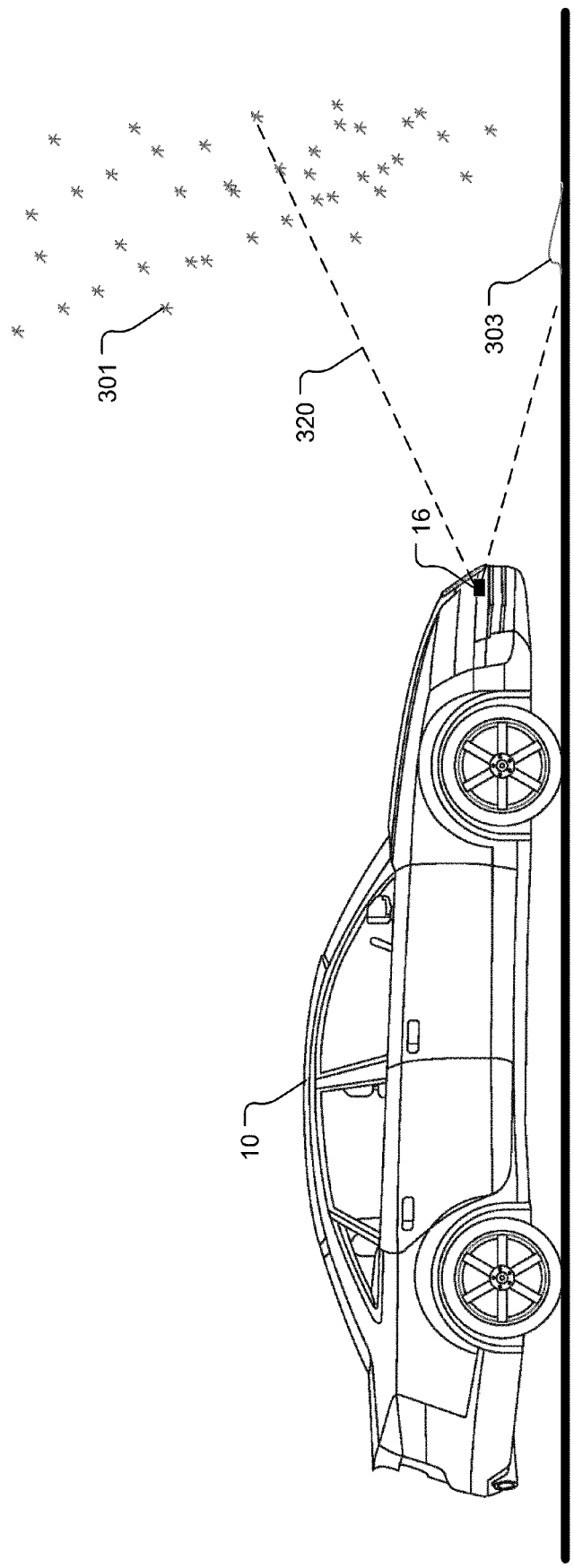
FIG. 9 depicts an autonomous vehicle sensing falling snow and snow on a road using a single sensor.
Figure 10:
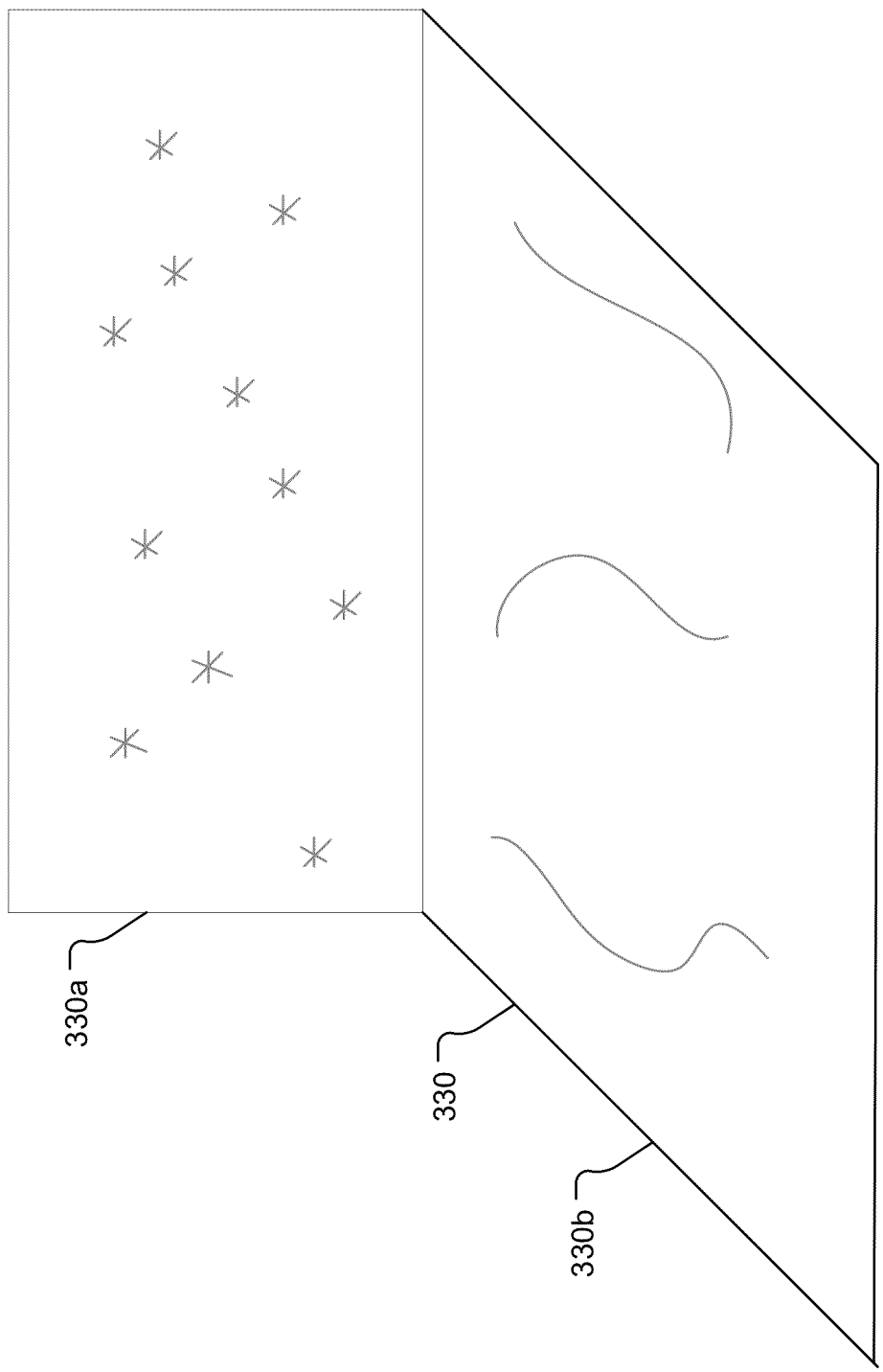
FIG. 10 depicts an image captured by the sensor of the vehicle of FIG. 9.

In another embodiment, which is shown in FIG. 9, a single forward-facing camera 16 has a wider field of view 320 that captures images of both the airspace in front of the vehicle and the roadway in front of the vehicle. In this field of view, the camera captures an image that shows the falling snowflakes 301 and the snow on the road 303. The single image 330 is shown by way of example in FIG. 10. The single image of FIG. 10 includes an upper (airspace) portion 330a and a lower (road) portion 330b.

In the embodiments in which the vehicle has a camera, the processor of the vehicle can be configured to compare the images captured by the camera to reference images stored in a memory. The memory can store a database of reference images with associated coefficients of friction. The reference images and associated coefficients of friction can be downloaded to the memory of the vehicle from an external source, e.g. another vehicle, a server, server cluster, server farm, cloud-based service, etc. The reference images and associated coefficients of friction can also be generated locally by the vehicle. In a variant, the coefficients of friction associated with each of the reference images can be modified or adjusted as the vehicle learns (from its own accelerometer readings) how it actually behaves on the snowy or icy surfaces. The refined coefficients may optionally be shared with the server to enable the server to refine its own database of coefficients. The vehicle may optionally also transmit the local temperature, humidity or road-tire acoustic signals to the server to enable the server to continually refine a multivariate friction model that defines for different coefficients for each of the snow images based on temperature and/or humidity and/or acoustic signals. As such, the vehicles act as data-collection devices that continually supply data to the server to refine its snow slipperiness model(s).

Figure 11:
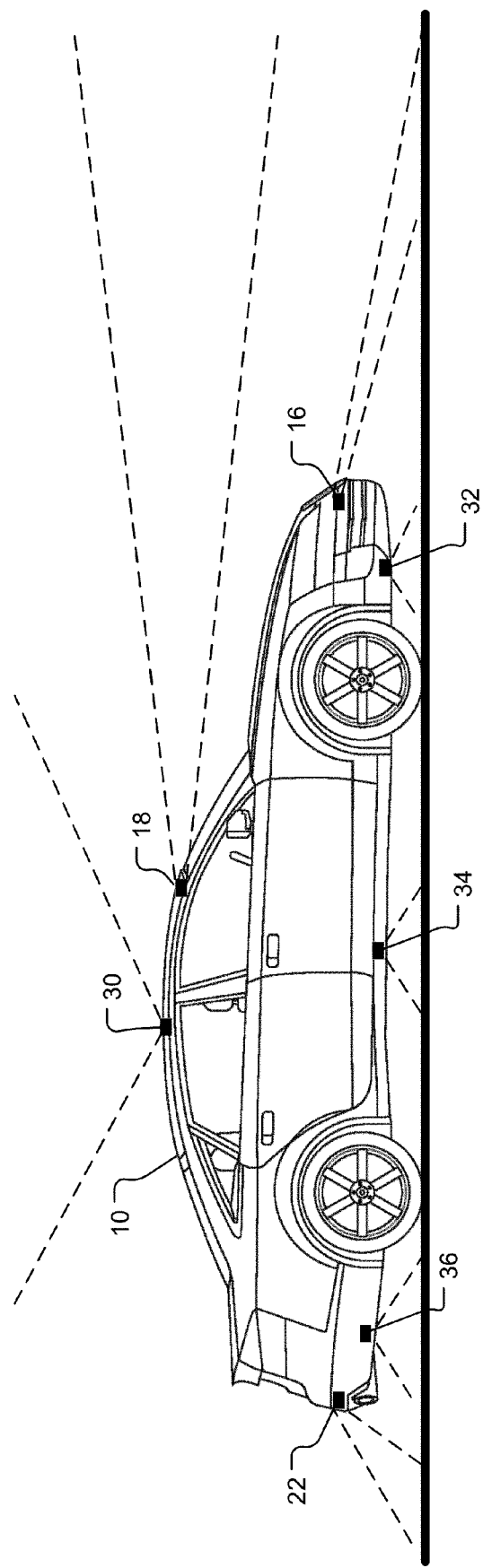
FIG. 11 depicts an autonomous vehicle having a plurality of sensors.

FIG. 11 depicts an autonomous vehicle having a plurality of sensors. In this example embodiment, the autonomous vehicle 10 may have a top-mounted sensor 30 and/or under-mounted sensors 32, 34, 36. In this particular embodiment, there is a single top-mounted sensor 30 for sensing properties of falling snow. In this particular embodiment, there are three under-mounted sensors 32, 34, 36 for measuring snow quality parameters of the snow on the ground. These sensors 30, 32, 34, 36 are in addition to the forward sensors 16, 18 and rear sensor 22. The under-mounted sensors may be any suitable combination of visible-spectrum cameras, infrared cameras, thermal imaging cameras, temperature sensors, humidity sensors, and/or acoustic sensors.

An acoustic sensor can be used to receive tire-snow acoustic signals which are indicative of snow quality. For example, when the snow is wet, the acoustic signal from the tire-snow interaction will be different than when the snow is wet. The sound (acoustic signal) of the tire rolling over the snow thus enables the processor to infer the slipperiness of the snow.

Figure 12:
FIG. 12 depicts a snow temperature map of snow covering a road.

In one embodiment, one of the vehicle sensors is a thermal imaging camera that senses a temperature of the snow on the road. The thermal imaging camera may also provide a snow temperature gradient or snow temperature map of a section of snow-covered roadway such as the one shown by way of example in FIG. 12. This enables the processor to compute individual coefficients of friction for each of the four tires. As shown in FIG. 12, a snow temperature map 400 may differentiate different regions of the roadway section based on different temperatures or ranges of temperatures 410, 420, 430. In the example of FIG. 12, there are three temperature ranges although in other implementations there may be a different number of ranges with greater or less temperature granularity. The snow temperature maps may be downloaded to each vehicle from the server. The snow temperature maps may be downloaded prior to starting a journey to a known destination. The snow temperature maps may be downloaded in real-time, i.e. just prior to traveling over a particular section of roadway. The snow temperature maps may also be generated by a first vehicle and shared with a second vehicle.

Figure 13:
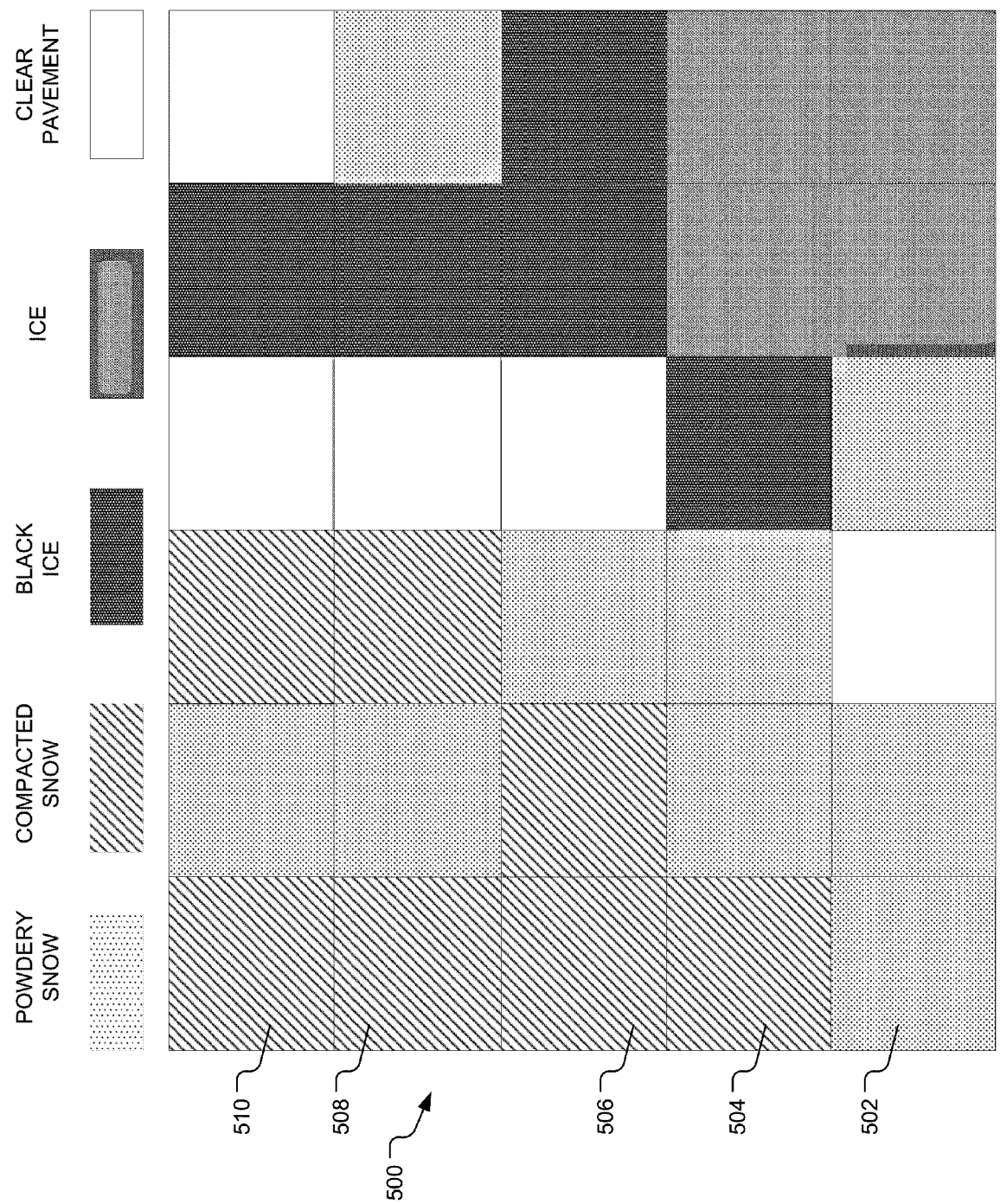
FIG. 13 depicts a snow and ice map showing different types of snow and ice covering a road.

FIG. 13 depicts a snow and ice map showing different types of snow and ice covering a road. The map may be generated by one particular vehicle using its onboard sensors. The map may be transmitted to the server 250 or shared directly with another vehicle. In FIG. 13, the example map 500 defines a grid of five rows and six columns of generally square elements. The five rows extend progressively forward of the vehicle. These five rows 502, 504, 506, 508, 510 can optionally be processed sequentially by the processor to sequentially adjust driving behaviour or the entire grid can be averaged depending on processor speed and/or vehicle speed. The granularity or resolution of the grid can be predetermined or automatically adjusted based on vehicle speed. In a variant, the processor can be configured to utilize only the elements corresponding to the tire tracks when the vehicle is travelling straight and to only use the central elements when turning. In the example map 500 of FIG. 13, there are five categories or classifications: powdery snow, compacted snow, black ice, normal ice, and clear pavement. It will be appreciated that these are examples only and any other suitable classifications may be used instead.

Figure 14:
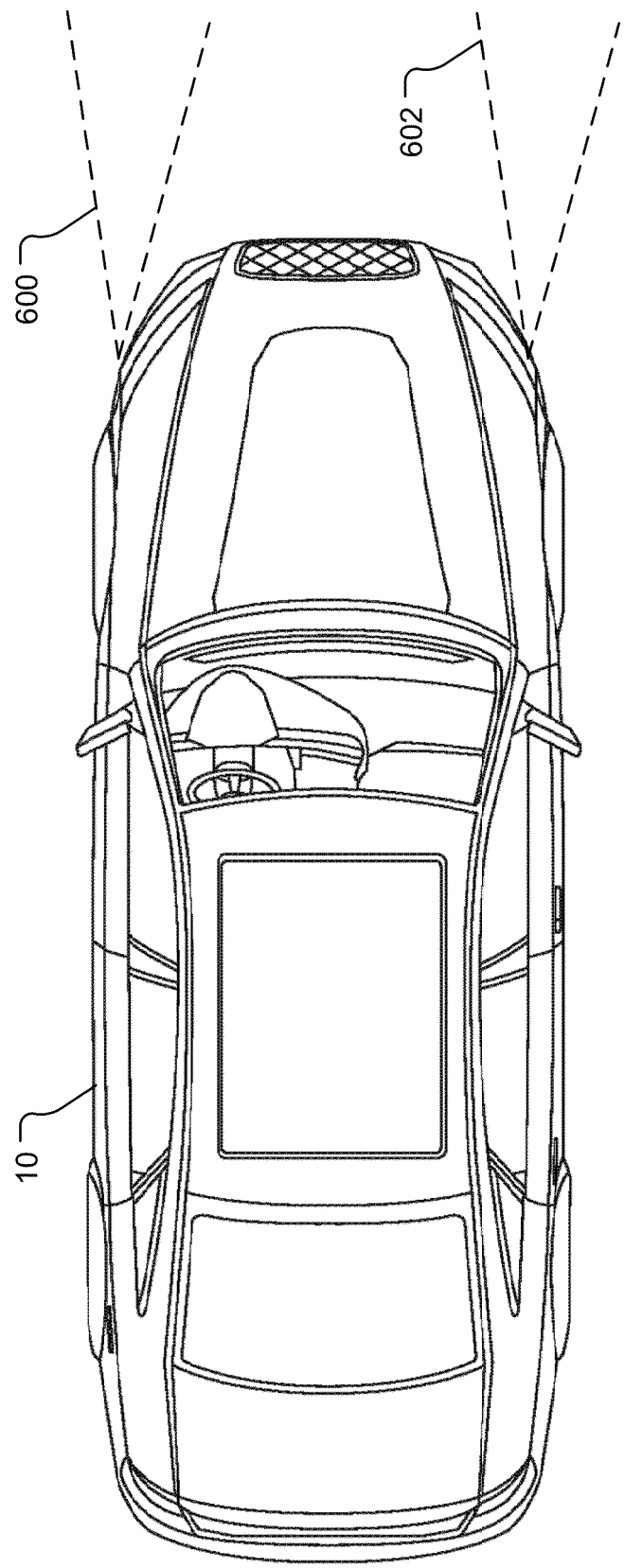
FIG. 14 depicts an autonomous vehicle having two track-specific sensors aligned with projected tire tracks.

FIG. 14 depicts an autonomous vehicle 10 having two track-specific sensors aligned with projected tire tracks. The track-specific sensors capture images for left and right track-specific fields of view 600, 602.

Figure 15:
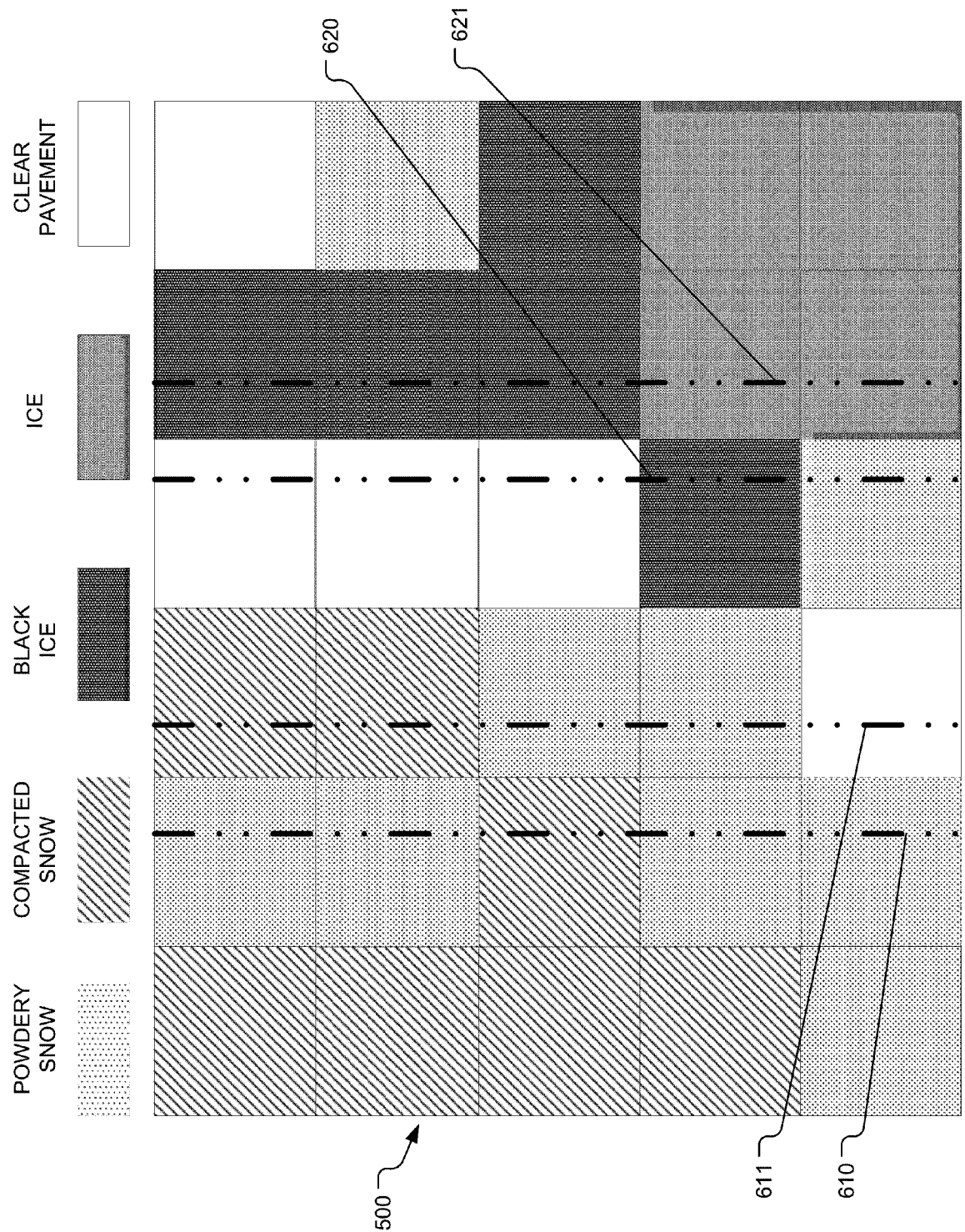
FIG. 15 depicts the projected tire tracks overlaid on the snow and ice map of FIG. 13.

FIG. 15 depicts the projected tire tracks defined by left track boundaries 610, 611 and right track boundaries 620, 621 overlaid on the snow and ice map 500 of FIG. 13. In this embodiment, the vehicle processor can utilize only the data from the elements that correspond to the tire tracks while ignoring those elements that do not align with the left and right tire tracks.

Figure 16:
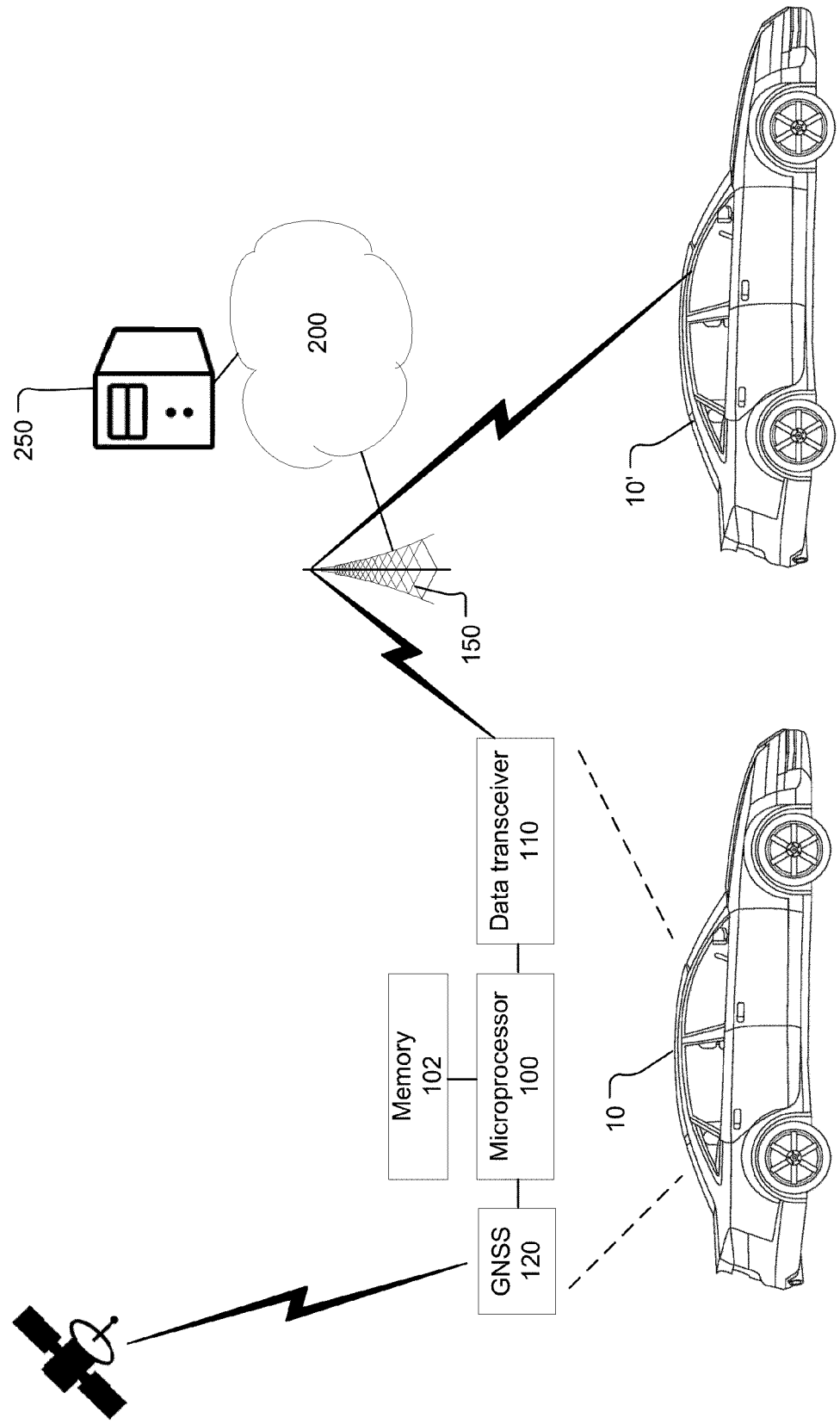
FIG. 16 depicts a first vehicle autonomous sharing road slipperiness data with a second vehicle via a networked server.

As shown in FIG. 16, the autonomous vehicle 10 can use its data transceiver 110, e.g. a cellular radio frequency transmitter, to receive snow friction data or estimated instantaneous coefficients of friction from another vehicle 10' that is driving ahead of it on the same road. As shown in FIG. 16, the forward (preceding) vehicle 10' collects and provides snow slipperiness data to the server 250 via the base transceiver station 150 and the internet 200. The trailing (following) vehicle 10 uses its data transceiver 110 to receive the snow friction data from the server 250 via the internet 200 and the same or another base transceiver station 150. The received data may be processed by the processor 100 to verify that it relates to the vehicle's present route. The data is then stored in its memory 102. The processor 100 receives location updates from the GNSS receiver 120 and compares its current location with the location-tagged snow friction data in its memory 101. The vehicle 10 uses the received location-tagged snow friction data to adjust driving behaviour when the location tag of the snow data corresponds to the current location of the vehicle as determined by its GNSS receiver 120.

Figure 17:
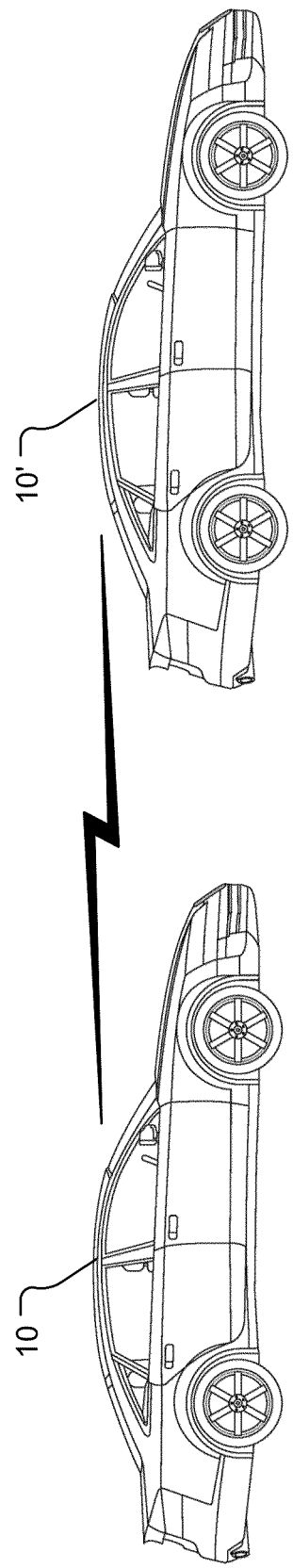
FIG. 17 depicts a first vehicle autonomous sharing road slipperiness data with a second autonomous vehicle via a direct short-range wireless link.

FIG. 17 depicts a first vehicle autonomous 10' sharing road slipperiness data with a second autonomous vehicle 10 via a direct short-range wireless link. In other embodiments, there may be multiple vehicles sharing data with a single vehicle or one vehicle sharing data with multiple vehicles or multiple vehicles sharing data with multiple vehicles.

Figure 18:
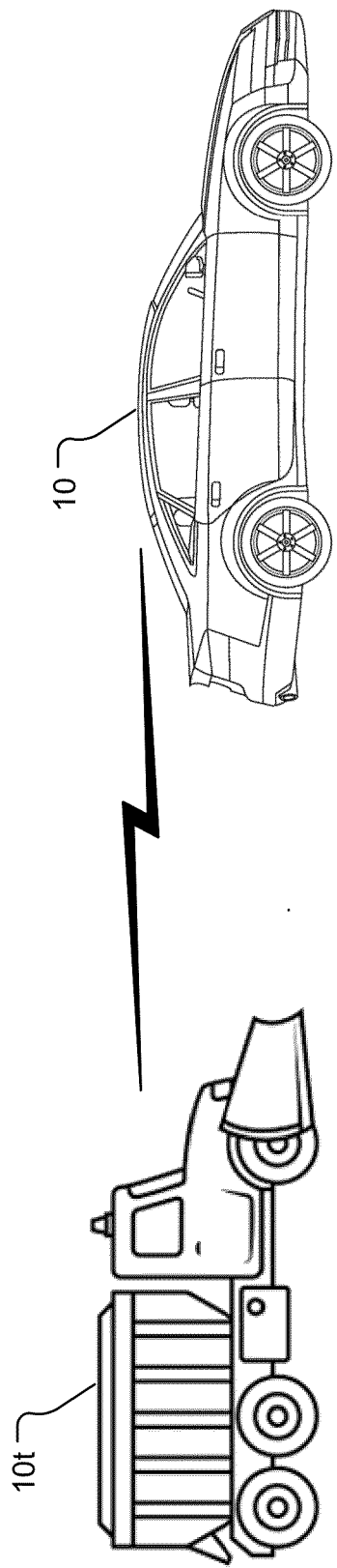
FIG. 18 depicts a first vehicle autonomous sharing road slipperiness data via a direct short-range wireless link with a salt truck as an example of a second autonomous vehicle.

FIG. 18 depicts a first vehicle autonomous 10 sharing road slipperiness data via a direct short-range wireless link with a salt truck 10t as an example of a second autonomous vehicle. The salt truck may be an autonomous truck that receives snow data from various vehicles and then determines a most efficient route to maximize salting of the slipperiest sections of road based on real-time data collected by vehicles in the area. The salt truck may be a sand truck or a snow plow, snow blower, grader or any other snow-removal vehicle.

Figure 19:
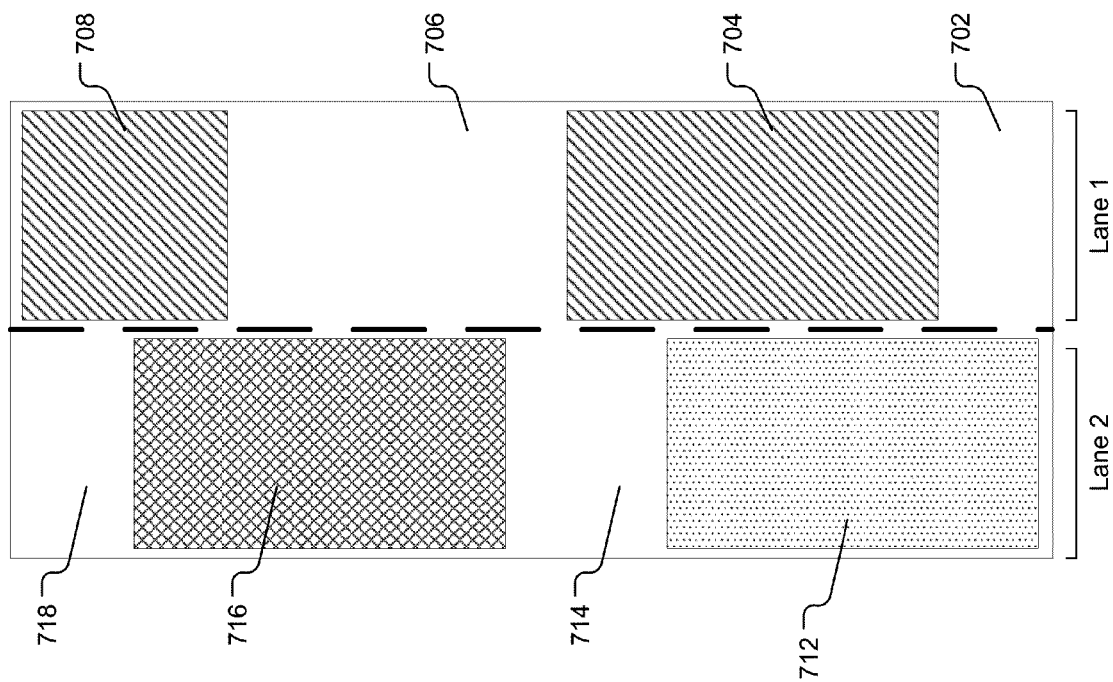
FIG. 19 depicts lane-based snow mapping to enable the autonomous vehicle to select the least slippery lane for safest travel.

FIG. 19 depicts lane-based snow mapping to enable the autonomous vehicle to select the least slippery lane for safest travel. In the embodiment of FIG. 19, there are two lanes (designated Lane 1 and Lane 2). The autonomous vehicle receives snow condition data for Lanes 1 and 2. Lane 1 has a first segment 702 of bare pavement followed by a second segment 704 of snow-covered roadway followed by a third segment 706 of bare pavement followed by a fourth segment 708 of more snow-covered roadway. Lane 2 has a first segment 712 of ice-covered roadway, a second segment 714 of bare pavement, a third segment 716 of mixed ice and snow and a fourth segment 718 of bare pavement. Based on the friction coefficients associated with each class of snow or ice condition, the vehicle automatically selects which lane to take. The friction differential between the lanes may be only one of other potential considerations in selecting a lane such as traffic congestion and/or whether the vehicle is going to make a left or right turn.

The autonomous vehicle 10 in some embodiments further comprises a tire sensor for sensing a physical property of the tire to further refine the snow-tire friction estimation. In one embodiment, the tire sensor is a tire temperature sensor that measures a surface temperature of the tire. For example, the tire temperature sensor may be an infrared sensor that measures the infrared signature of the tire. The tire temperature sensor may be mounted in the wheel well. The tire temperature sensor may be a wireless sensor embedded directly into the tire. The tire sensor may be a camera or other optical sensor that visually scans a tire tread to determine how much the tire tread is clogged by snow.

Figure 20:
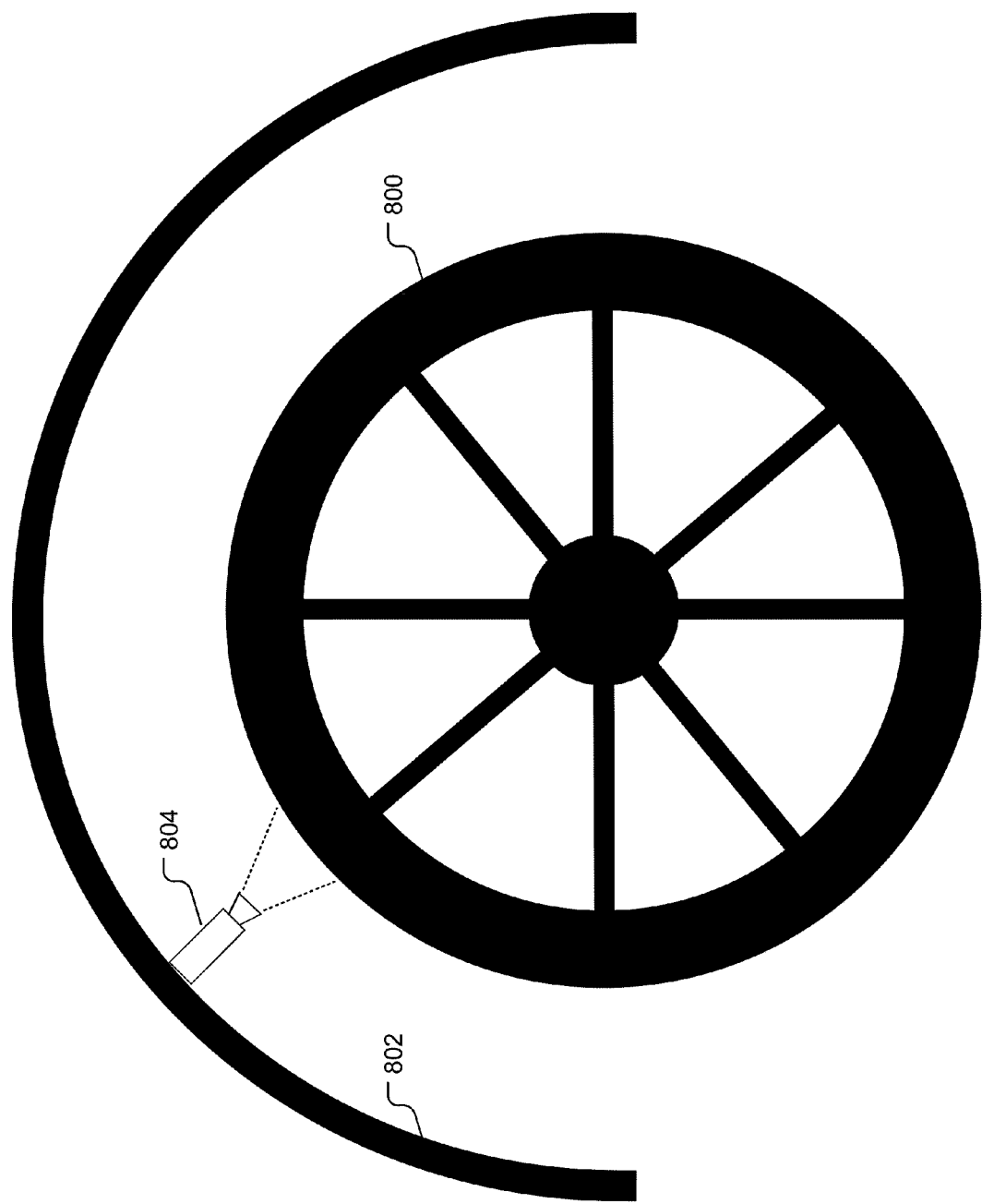
FIG. 20 depicts a tire sensor to visually detect whether a tire is snow-clogged.

FIG. 20 depicts a tire sensor to visually detect whether a tire is snow-clogged as another physical property of the tire. In the embodiment depicted by way of example in FIG. 20, a tire 800 of an autonomous vehicle is disposed within a wheel well 802. A tire sensor 804 is disposed on the wheel well to visually detect whether the tire is snow-clogged or otherwise covered or partially covered with snow.

Figure 21:
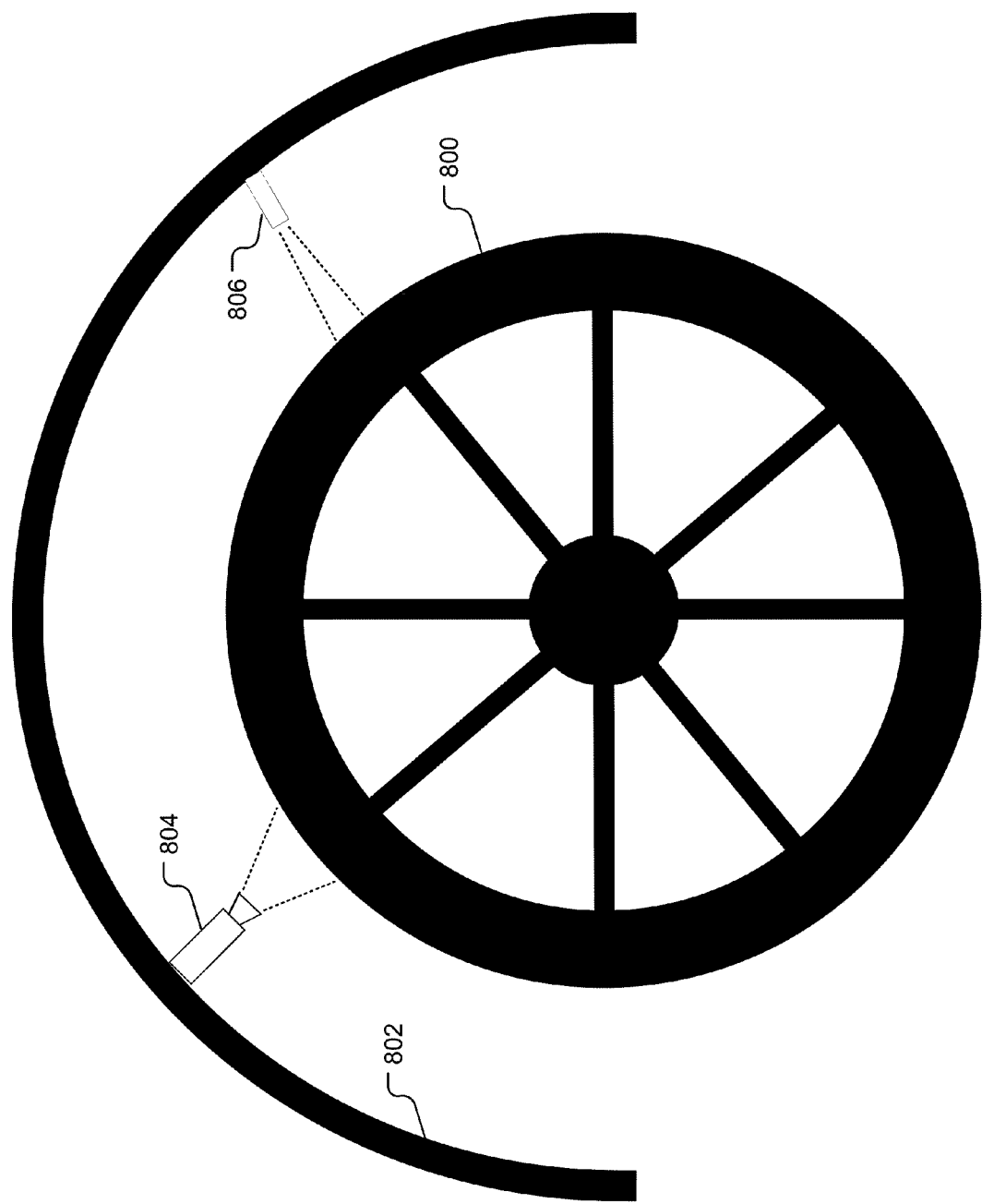
FIG. 21 depicts two tire sensors, one optical and one infrared, to visually detect snow on the tire.

FIG. 21 depicts two tire sensors, one optical and one infrared, to detect snow on the tire 800 within the wheel well 802 of an autonomous vehicle. In this example, the first tire sensor 804 is an optical sensor (visible spectrum camera) to capture images of the tire 800 whereas the second tire sensor 806 is an infrared sensor to capture a heat map of the tire 800. Both sensors may be mounted in the wheel well as shown.

The sensors may become covered with snow and ice during driving. To address this issue, the sensors may have covers or cleaning mechanism.

Figure 22:
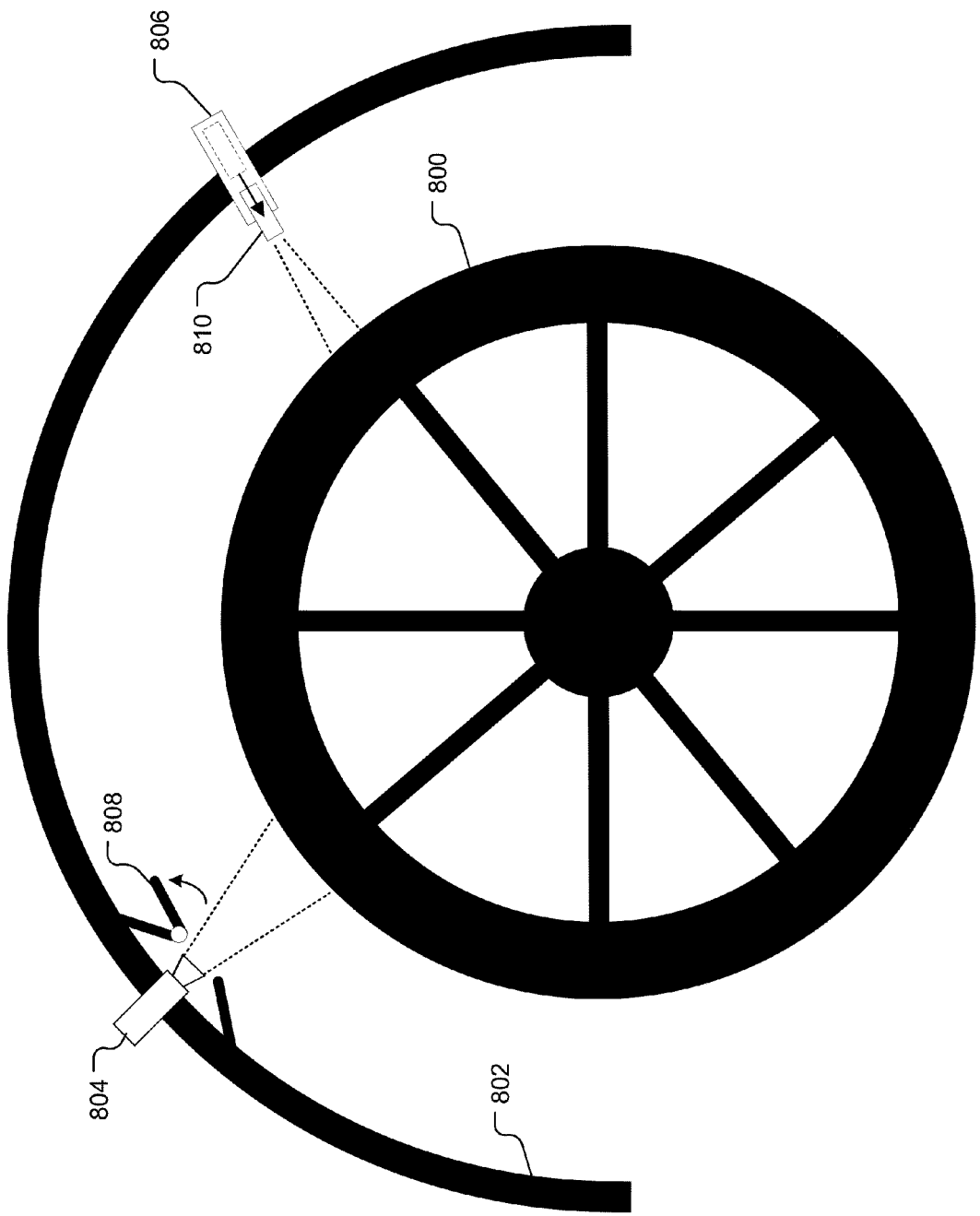
FIG. 22 depicts a tire sensor with a movable protective cover and a second tire sensor that is retractable.

FIG. 22 depicts a first tire sensor 804 with a movable protective cover 808 and a second tire sensor 806 that is retractable, i.e. has a retraction/extension mechanism 810. The movable protective cover 808 may be a pivoting hatch that pivots between a first open position exposing the sensor and a second closed position sheltering the sensor. The retraction/extension mechanism may include an actuator or servo to extend and retract the sensor. The retractable sensor may also include a protective cover.

Figure 23:
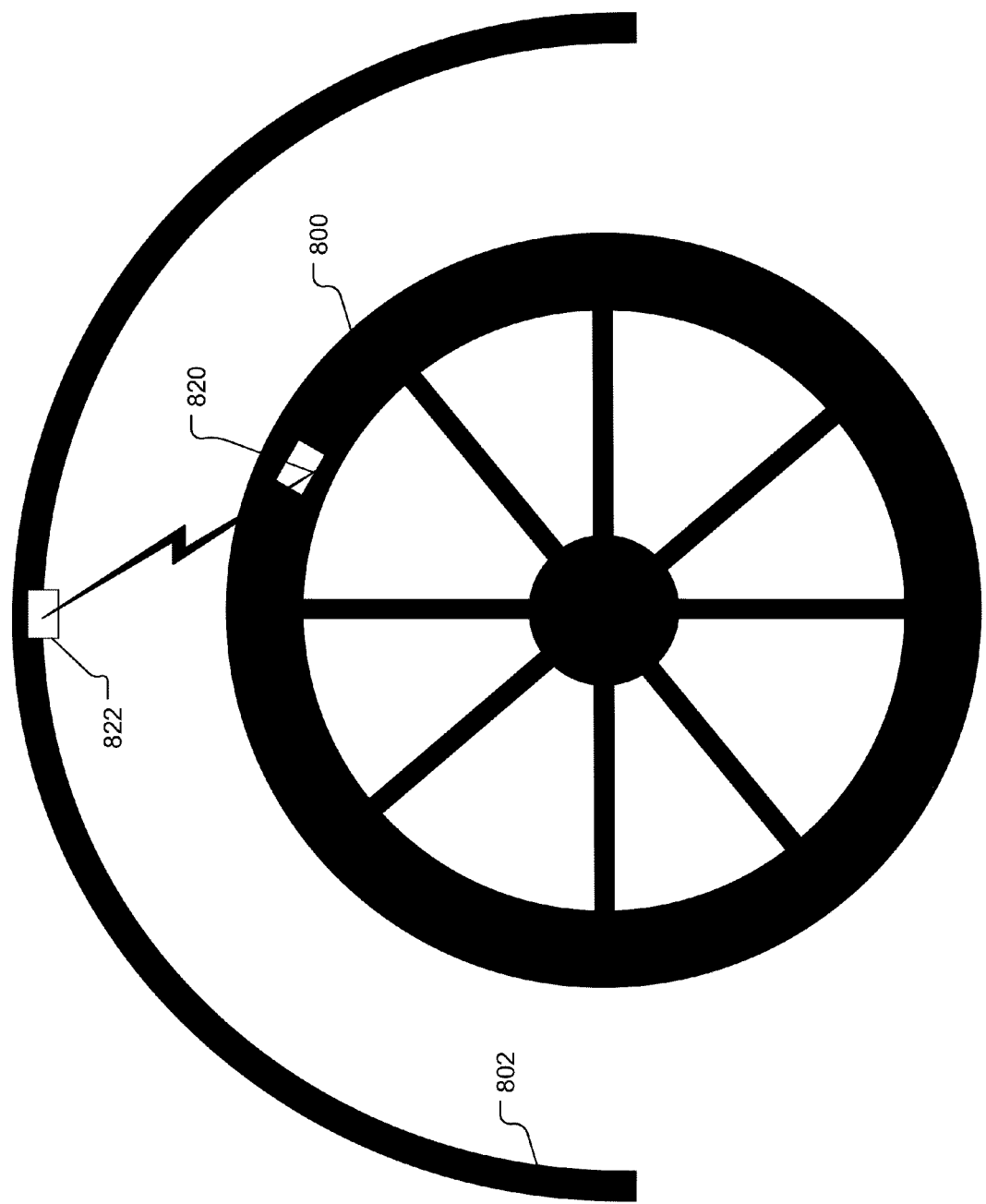
FIG. 23 depicts a wireless tire sensor embedded in the tire.

FIG. 23 depicts an embedded wireless tire sensor 820 embedded in the tire 800 or attached to the wheel such that it senses tire pressure. The wireless tire sensor 820 transmits pressure data to a wireless receiver or monitoring device 822. The tire pressure is used to adjust the calculated friction of the tire with the snow-covered road surface. The friction of the tire generally decreases with increasing tire pressure. Thus, the tire pressure can be used to provide a more accurate determination of friction.

Figure 24:
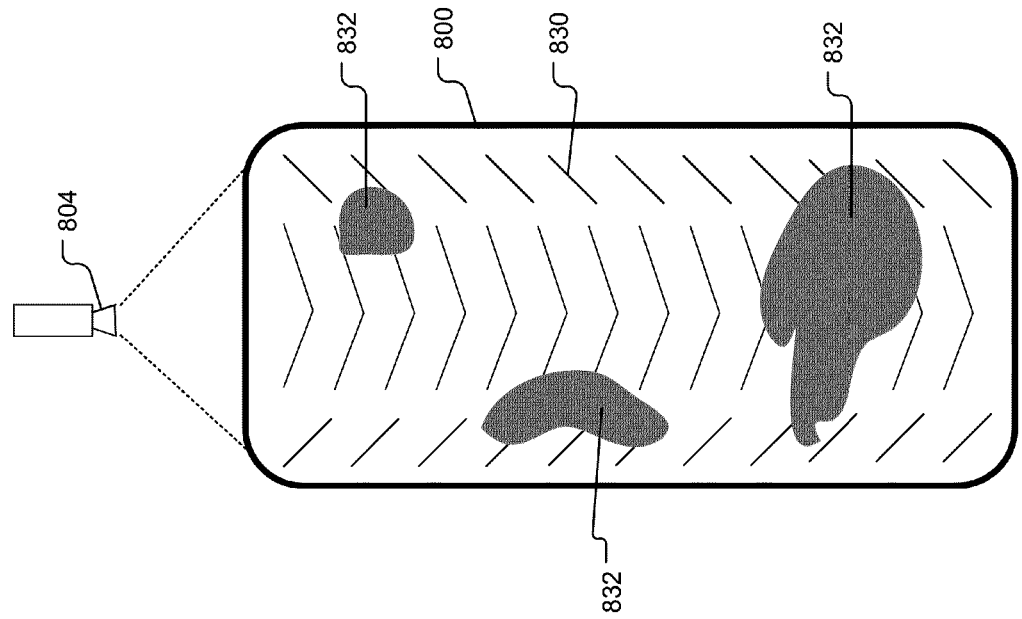
FIG. 24 depicts a tire sensor scanning a tire tread to provide a detailed snow profile of the tire tread.

FIG. 24 depicts a tire sensor 804 scanning, e.g. optically scanning, a tire tread 830 of a tire 800 to provide a detailed snow profile of the tire tread. Snow patches or snow accumulations 832 on the tire tread are detected by the tire sensor. By detecting how much snow is on the tire tread the processor of the vehicle can determine the average coefficient of friction of the tire. In some embodiments, the tire sensor scans the tire only at low tire rotational velocity. In some embodiments, there is a tire sensor for each of the four tires of the vehicle. In some embodiments, there the tire sensor is controlled to take measurements at predetermined intervals of time. In some embodiments, the tire sensor is controlled to take measurements when the vehicle detects that the road surface condition has changed, e.g. changed from snow-covered to dry road, from ice to snow, from mixed ice-and-snow to snow, from powdery snow to compacted snow, etc.

Figure 25:
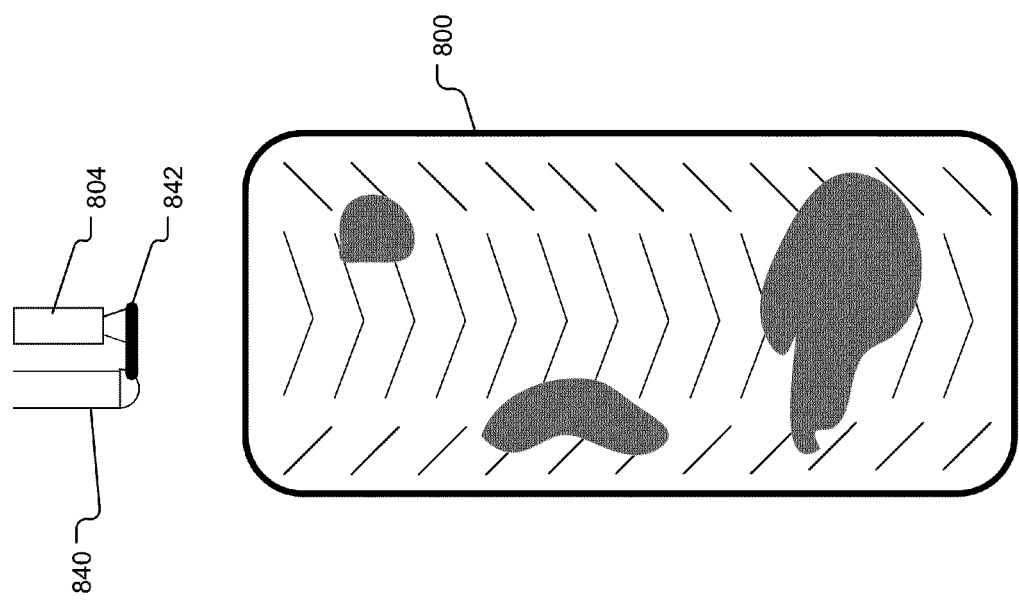
FIG. 25 depicts a tire sensor with a wiper.

FIG. 25 depicts a tire sensor 804 with a wiper. The wiper has a wiper motor 840 and a wiper blade 842. The wiper may also include a washer fluid ejector for squirting washer fluid onto the tire sensor to enable the wiper to better clean the tire sensor.

Figure 26:
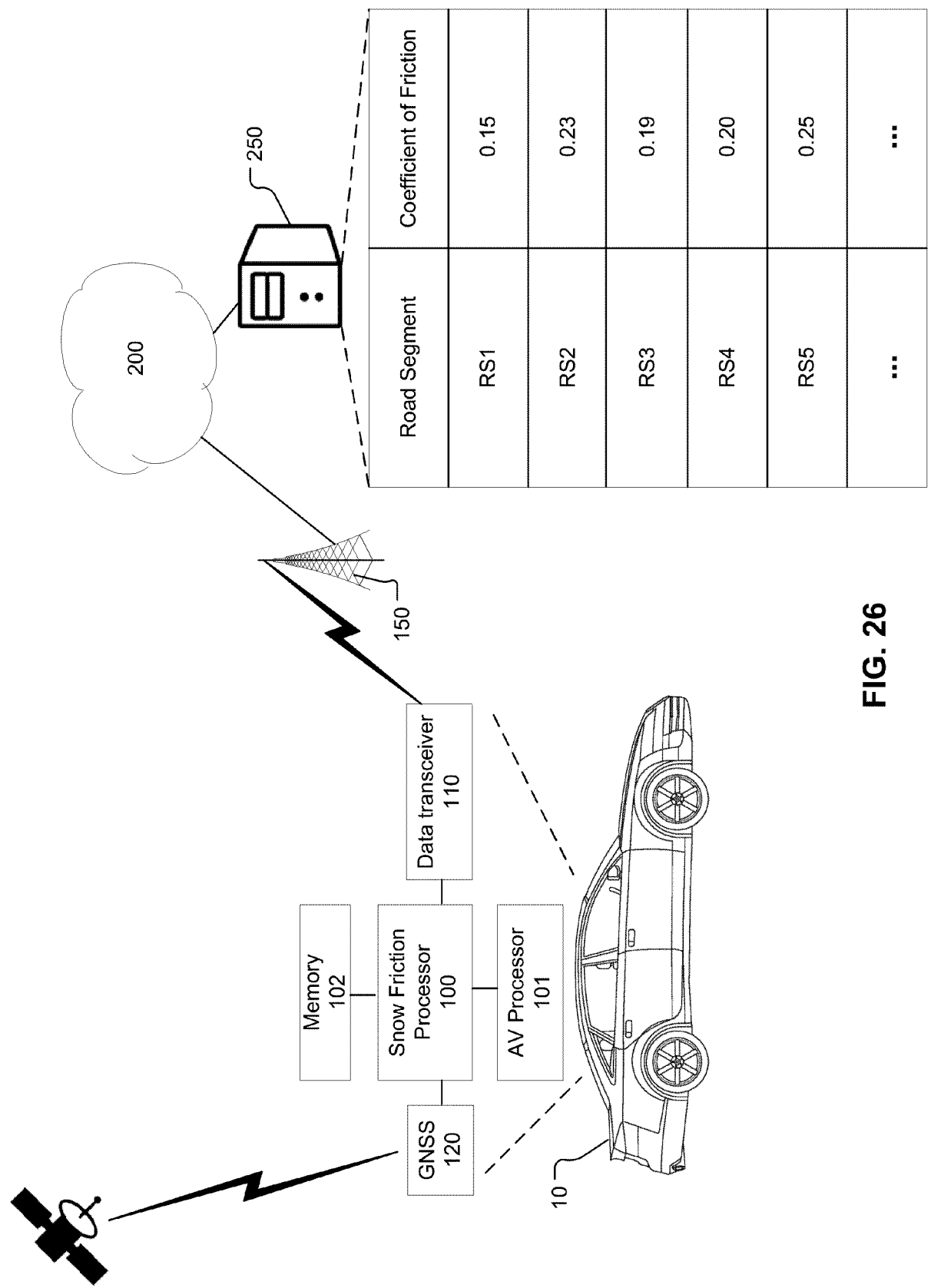
FIG. 26 depicts a system in which an autonomous vehicle has a separate snow friction processor and autonomous driving processor and in which the vehicle communicates with a server hosting a database of snow friction coefficients for various segments of a roadway.

FIG. 26 depicts a system in which an autonomous vehicle 10 has a separate snow friction processor 100 and autonomous driving processor 101 which are communicatively coupled to enable the snow friction processor 100 to provide snow friction data to the AV driving processor 101 to enable the AV driving processor 101 to adjust driving behaviour of the AV based on the snow friction data. The autonomous vehicle 10 has a memory 102, a data transceiver 110 and a GNSS receiver 120. The data transceiver 110 in the vehicle 10 communicates via a base station transceiver 150 through the internet 200 with a server 250 hosting a database of snow friction coefficients for various segments of a roadway.

Figure 27:
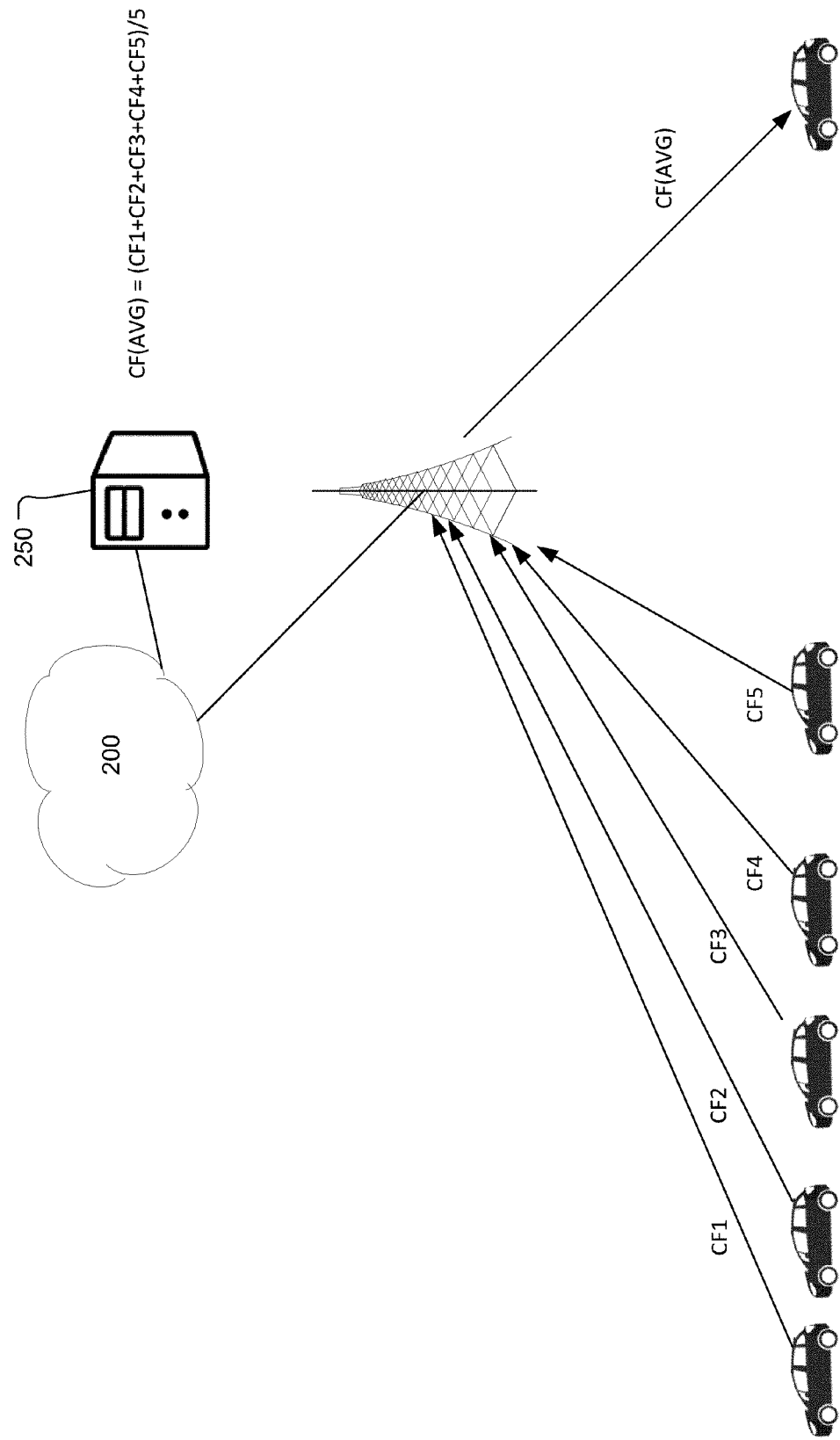
FIG. 27 depicts an ad hoc network of autonomous vehicles sharing snow friction data with another vehicle.

FIG. 27 depicts an ad hoc network of autonomous vehicles sharing snow friction data with another vehicle. In this example, there are five vehicles passing sequentially over a particular location. Each vehicle collects coefficient of friction (CF) data, namely CF1, CF2, CF3, CF4 and CF5, and transmits its CF data via a wireless gateway through the internet 200 to a server 250. The server 250 computes an average coefficient of friction ($CF_{AVG}$) and then transmits the average coefficient of friction ($CF_{AVG}$) to a trailing vehicle to enable the vehicle to automatically adjust its driving behaviour when it passes the particular location. As will be understood, the five preceding vehicles can continually, periodically or intermittently collect and transmit CF data to the server so that the server can provide ongoing average CF data to the trailing vehicle. The number of collecting vehicles may be varied in other instances. Likewise, in other cases, there may be more than one recipient vehicle. A vehicle may be both a collecting vehicle and a recipient vehicle. In other words, a vehicle may collect and transmit data while also receiving data from an external source.

Figure 28:
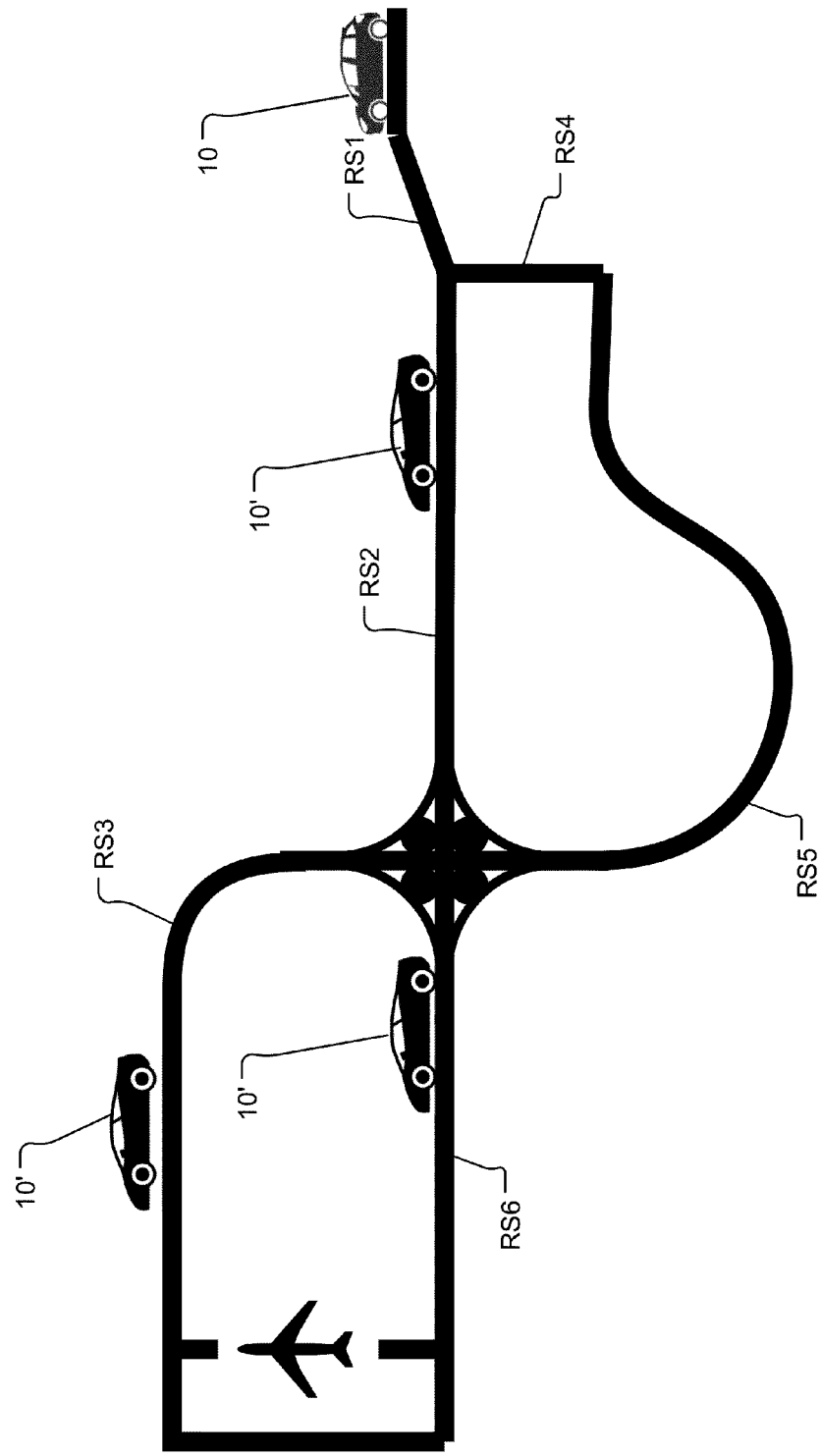
FIG. 28 depicts a map of a navigation subsystem of the autonomous vehicle that takes into account the slipperiness data for selecting or changing the route to a destination.

In the embodiment depicted in FIG. 28, the snow slipperiness data may be used by a navigation system or navigation application to determine a route to a destination or to determine a detour. The snow slipperiness data for segments of a route may be used to determine a safe traveling velocity and then to determine a travel time or estimated time of arrival at the destination. Snow slipperiness data may be collected by a plurality of data-collecting vehicles 10' and shared with a data-recipient vehicle 10. In this example, there are three data-collecting vehicles 10' collecting snow slipperiness data for sharing with a single data-recipient vehicle 10 although the number of collecting vehicles 10' and the number of recipient vehicles 10 may be varied in other cases. In the example of FIG. 28, there are six road segments RS1, RS2, RS3, RS4, RS5 and RS6 for which snow slipperiness data is collected. There may be any number of road segments in other examples. The snow slipperiness data may be collected at any suitable sampling rate of the sensors aboard the vehicle(s). Likewise, snow slipperiness data may be stored for any size of segment, e.g. 10 cm, 25 cm, 50 cm, 1 m, 2 m, 5 m, 10 m, etc.

Although the specification refers to "snow", it will be understood that "snow" is meant to encompass sleet, ice pellets or other icy forms of precipitation.

From the foregoing description and related drawings, it will be appreciated that in various embodiments, the autonomous vehicle comprises a plurality of sensors for sensing physical properties indicative of snow slipperiness and a processor communicatively connected to the sensors to receive signals from the sensors indicative of snow slipperiness, to process the signals and to generate an estimated instantaneous coefficient of friction between a tire of the vehicle and a snow-covered roadway. In some of these embodiments, the processor causes a driving behaviour of the vehicle to be adjusted based on the estimated instantaneous coefficient of friction. In some of these embodiments, the autonomous vehicle comprises a radio frequency transmitter that cooperates with the processor to transmit the estimated instantaneous coefficient of friction to another vehicle.

In further embodiments, the processor receives accelerometer data indicative of one or more of braking slippage, acceleration slippage and cornering slippage and wherein the processor correlates the estimated instantaneous coefficient of friction with the accelerometer data in order to refine a model that relates how the signals from the sensors are processed to be indicative of snow slipperiness.

In some embodiments, the plurality of sensors comprises an air temperature sensor to determine an exterior ambient air temperature and a surface temperature sensor to determine a surface temperature of the snow-covered roadway. In one embodiment, the vehicle has a sensor to determine exterior ambient temperature and then uses its processor to predict the snow friction based on the temperature. In another embodiment, the relative humidity is also sensed and taken into consideration in evaluating the friction of the snow. In one embodiment, the vehicle has a road-facing temperature sensor to measure road surface temperature, e.g. the temperature of the snow on the surface of the road.

In some embodiments, the plurality of sensors comprises a first optical sensor to capture images of a road that is at least partially covered with snow and a second optical sensor to determine a snow flake size of falling snow.

In some embodiments, the plurality of sensors comprises a tire sensor for sensing a physical property of the tire and an acoustic sensor to receive tire-snow acoustic signals. The tire sensor measures a surface temperature of the tire. The tire sensor visually scans a tire tread to determine how much the tire tread is clogged by snow In one embodiment, a network of vehicles collect and share sensor data along with vehicle slippage data (e.g. braking, acceleration and cornering data) to correlate the sensor data with the actual roadway performance of the vehicle. By collecting snow data and correlating it to the actual roadway performance, a snow slipperiness model can be constantly refined by the vehicles equipped with the sensors.

In one embodiment, a first vehicle can share slipperiness data for a segment of road with a second vehicle. Thus, a first vehicle skidding or slipping at a location may share the location with the second vehicle.

In one embodiment, the vehicle sensor scans the falling snow ahead of the vehicle to determine a snow characteristic, e.g. flake size. The flake size or granularity of the snow falling is indicative of the type of snow and can be considered another factor in evaluating the slipperiness of the snow.

In one embodiment, the sensor detects the snow melting on the front, side or rear windshields of the vehicle. The speed with which the snow melts can be also used to characterize the snow that is falling. The processor may also take into account the vehicle speed, wind speed, wind chill, exterior temperature, interior cabin temperature, whether the windshield defroster is on or off. The windshield temperature may also be measured.

In one embodiment, the vehicle has an acoustic sensor to receive tire-snow acoustic signals. Depending on the speed of the vehicle and the nature of the snow, e.g. wet snow versus dry snow, compacted snow versus loose powdery snow, the sound that the tires make on the snow will provide an indication of the snow quality. Correlating the acoustic signals with actual snow slipperiness data enables the processor to be trained to recognize snow slipperiness from its acoustic signals.

In some embodiments, the vehicle has a tire sensor at least one tire. The vehicle may have one sensor for each tire, or even multiple sensors for each tire. The tire sensor may determine the surface temperature of the tire. The tire sensor may also measure a tire inflation pressure. The tire sensor may also scan or visually inspect the tire to determine if the tire is coated with snow and ice or how much of it is coated with snow and ice, i.e. whether the treads are exposed, partially exposed or entirely clogged. The tire sensor may be located in the tire well, and may have a wiper or retractable cover to keep it clean.

In another implementation, the processor of the autonomous vehicle may use the sensors to detect tracks in the snow formed by one or more preceding vehicles. The processor may be configured to guide the vehicle over the tracks. In a variant, the processor may be configured to avoid the tracks, e.g. in a situation where the tracks straddle two lanes or in a situation where the tracks are icy and thus slipperier than the snow-covered portion of the road.

In another aspect of the invention, a group or plurality of autonomous vehicles form a network, or ad hoc network, to share snow slipperiness data. The data may be stored in a server, server cluster, server farm or cloud-based storage such that the data is accessible to all vehicles in the group. The data uploaded to the server(s) from the vehicles in the group may include either the raw data (slipperiness data) or the locally calculated coefficient of friction. The data is either transmitted by the vehicles, i.e. pushed to the server(s), or the data may be requested by the server(s), i.e. pulled by the server(s). In this implementation, the data includes, in addition to the slipperiness or coefficient of friction, the location of the vehicle where the slipperiness/friction was measured. In this implementation, the data includes the time when the slipperiness/friction was measured.

In another aspect of the invention, a first vehicle may transmit snow slipperiness data to a second vehicle that is following the first vehicle. The first vehicle may transmit the data in response to a request received by the first vehicle from the second vehicle.

In some embodiments, the autonomous vehicle automatically adjusts its driving behaviour based on the snow slipperiness that it detects or which it receives from an external source (another vehicle or a server). The driving behaviour is understood in this context to mean how the vehicle will brake, accelerate or corner. In addition, the vehicle may use snow data to plot a route to a destination to minimize travel over snow-covered roads. The snow data may also be used to calculate the reduced speed of travel over snow-covered roads and thus to provide a more accurate estimated time of arrival. In another implementation, the vehicle may take a detour to avoid slippery roads or segments of roads.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An autonomous vehicle comprising:
a sensor for sensing a physical property indicative of snow slipperiness; and
a processor communicatively connected to the sensor to receive a signal from the sensor indicative of the snow slipperiness, to process the signal and to generate an estimated instantaneous coefficient of friction between a tire of the vehicle and a snow-covered roadway,
wherein the physical property sensed by the sensor is a degree of snow compaction indicative of the snow slipperiness, wherein the sensor senses the degree of snow compaction by sensing whether the snow is loose and powdery or whether the snow is compacted,
wherein the processor receives accelerometer data indicative of one or more of braking slippage, acceleration slippage and cornering slippage and wherein the processor correlates the estimated instantaneous coefficient of friction with the accelerometer data in order to refine a model that relates how the signal from the sensor is processed to be indicative of snow slipperiness.

2. The autonomous vehicle of claim 1 wherein the processor adjusts a driving behavior based on the estimated instantaneous coefficient of friction determined by the processor.

3. The autonomous vehicle of claim 1 further comprising a short-range radio frequency transmitter that cooperates with the processor to transmit the estimated instantaneous coefficient of friction to another vehicle via a direct short-range wireless link.

4. The autonomous vehicle of claim 1 further comprising a road camera to capture images of a road that is at least partially covered with snow, the images being processed by the processor to determine the degree of snow compaction.

5. The autonomous vehicle of claim 1 further comprising a sensor that determines a snow flake size of falling snow, wherein the snow flake size is used by the processor to determine an adjusted coefficient of friction based on both the degree of snow compaction and the snow flake size.

6. An autonomous vehicle comprising:
a plurality of sensors for sensing physical properties indicative of snow slipperiness;
a processor communicatively connected to the sensors to receive signals from the sensors indicative of snow slipperiness, to process the signals and to generate a first, longitudinal estimated instantaneous coefficient of friction between a tire of the vehicle and a snow-covered roadway and a second, lateral estimated instantaneous coefficient of friction between the tire of the vehicle and the snow-covered roadway;

wherein the processor causes a driving behavior of the vehicle to be adjusted based on the first and second estimated instantaneous coefficients of friction; and a short-range radio frequency transmitter that cooperates with the processor to transmit the first and second estimated instantaneous coefficients of friction to another vehicle via a direct short-range wireless link, wherein the processor receives accelerometer data indicative of one or more of braking slippage, acceleration slippage and cornering slippage and wherein the processor correlates the first and second estimated instantaneous coefficients of friction with the accelerometer data in order to refine a model that relates how the signals from the sensors are processed to be indicative of snow slipperiness.

7. The autonomous vehicle of claim 6 wherein the plurality of sensors comprises:

a first optical sensor to capture images of a road that is at least partially covered with snow to determine a degree of snow compaction; and a second optical sensor to determine a snow flake size of falling snow.

8. The autonomous vehicle of claim 6 wherein the plurality of sensors comprises:

a tire sensor for sensing a physical property of the tire; and an acoustic sensor to receive tire-snow acoustic signals.

9. The autonomous vehicle of claim 8 wherein the tire sensor measures a surface temperature of the tire.

10. The autonomous vehicle of claim 8 wherein the tire sensor optically scans a tire tread to determine how much the tire tread is clogged by snow.

11. The autonomous vehicle of claim 8 wherein the tire sensor comprises a wiper, wherein the wiper has a wiper motor and a wiper blade.

12. The autonomous vehicle of claim 11 wherein the wiper includes a washer fluid ejector for squirting washer fluid onto the tire sensor to enable the wiper to clean the tire sensor.

13. The autonomous vehicle of claim 8 comprising a movable protective cover to cover the tire sensor and a retraction/extension mechanism to retract and extend the tire sensor.

14. An autonomous vehicle comprising:

a sensor for sensing a snow flake size of falling snow that is falling on a snow-covered roadway ahead of the autonomous vehicle;

a processor communicatively connected to the sensor to receive a signal from the sensor indicative of the snow flake size of the falling snow, to process the signal and to generate an estimated instantaneous coefficient of friction between a tire of the autonomous vehicle and the snow-covered roadway based on the snow flake size of the falling snow; and a second sensor for sensing a degree of snow compaction by sensing whether snow on the snow-covered roadway is loose and powdery or whether the snow on the snow-covered roadway is compacted, wherein the processor determines an adjusted coefficient of friction based on both the degree of snow compaction and the snow flake size.

15. The autonomous vehicle of claim 14 comprising a temperature sensor for sensing a temperature, wherein the processor determines a temperature-adjusted coefficient of friction based on the temperature, the degree of snow compaction and the snow flake size.

16. The autonomous vehicle of claim 14 comprising a humidity sensor for sensing a humidity, wherein the processor determines a humidity-adjusted coefficient of friction based on the humidity, the degree of snow compaction and the snow flake size.

17. The autonomous vehicle of claim 14 comprising temperature and humidity sensors for sensing a temperature and a humidity, wherein the processor determines a temperature-adjusted and humidity-adjusted coefficient of friction based on the temperature, the humidity, the degree of snow compaction and the snow flake size.

* * * * *